(12) United States Patent
Ikeda

(10) Patent No.: US 8,913,788 B2
(45) Date of Patent: Dec. 16, 2014

(54) APPARATUS, METHOD AND PROGRAM FOR DETERMINING THE SMOOTHNESS OF MOTION IN VIDEO DATA

(75) Inventor: Satoshi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 13/524,674

(22) Filed: Jun. 15, 2012

(65) Prior Publication Data

US 2012/0328154 A1 Dec. 27, 2012

(30) Foreign Application Priority Data

Jun. 23, 2011 (JP) ................................. 2011-139858
Apr. 17, 2012 (JP) ................................. 2012-094180

(51) Int. Cl.
| | | |
|---|---|---|
| *G06K 9/00* | (2006.01) | |
| *H04N 19/00* | (2014.01) | |
| *G06K 9/62* | (2006.01) | |
| *H04N 17/04* | (2006.01) | |

(52) U.S. Cl.
CPC ................. *G06K 9/62* (2013.01); *H04N 19/00* (2013.01); *H04N 17/04* (2013.01)
USPC ........................................................ 382/103

(58) Field of Classification Search
None
See application file for complete search history.

(56) References Cited

U.S. PATENT DOCUMENTS

| | | | | |
|---|---|---|---|---|
| 5,351,201 | A * | 9/1994 | Harshbarger et al. ......... | 348/187 |
| 6,809,746 | B2 * | 10/2004 | Whittington et al. ......... | 345/690 |
| 7,156,291 | B2 | 1/2007 | Ikeda | |
| 7,394,483 | B2 | 7/2008 | Oka | |
| 7,538,904 | B2 | 5/2009 | Ikeda et al. | |
| 7,594,115 | B2 | 9/2009 | Ikeda | |
| 2007/0211272 | A1 * | 9/2007 | Kang et al. ..................... | 358/1.9 |
| 2010/0265545 | A1 | 10/2010 | Ikeda | |

FOREIGN PATENT DOCUMENTS

| | | |
|---|---|---|
| JP | 2005-333564 A | 12/2005 |
| JP | 2008-072665 A | 3/2008 |

OTHER PUBLICATIONS

Kalin Atanassov ; Sergio Goma; Evaluating the quality of EDOF in camera phones. Proc. SPIE 7529, Image Quality and System Performance VII, 75290K (Jan. 18, 2010).*

* cited by examiner

*Primary Examiner* — Nirav G Patel
(74) *Attorney, Agent, or Firm* — Fitzpatrick, Cella, Harper & Scinto

(57) ABSTRACT

There is provided an information processing apparatus for calculating an evaluation value representing quality of a moving image. A second acquisition unit is configured to acquire position information representing a position of a chart image in each frame image of the input moving image. A cutout unit is configured to cut out, from each frame image of the input moving image, a partial image including the chart image based on the position information and generate a converted moving image having the cutout partial image as a frame image. A conversion unit is configured to frequency-convert the converted moving image at least in a temporal direction. A calculation unit is configured to calculate the evaluation value based on a frequency component value obtained by the conversion unit.

11 Claims, 35 Drawing Sheets

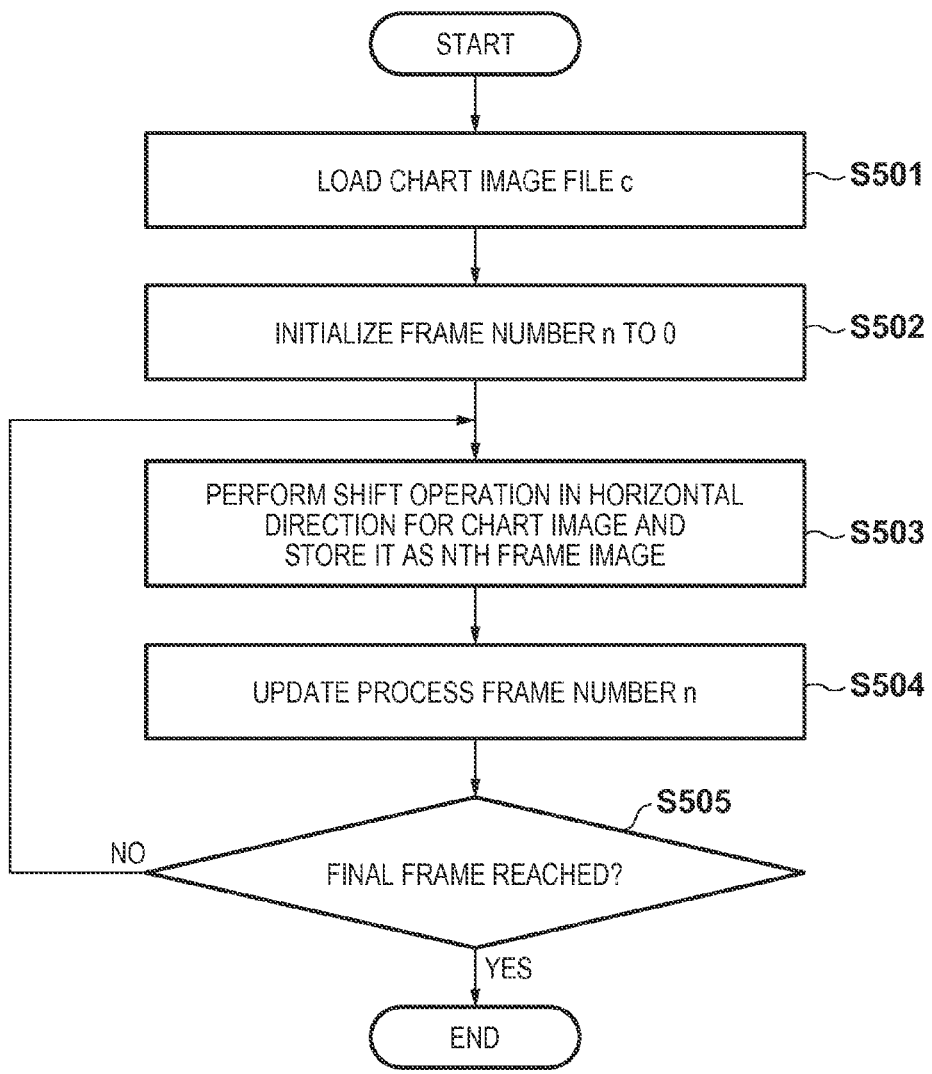

FIG. 6

EXAMPLE OF LINE-OF-SIGHT INFORMATION

FRAME NUMBER=0 ; LINE-OF-SIGHT CENTER COORDINATES=(1800, 512)
FRAME NUMBER=1 ; LINE-OF-SIGHT CENTER COORDINATES=(1795, 512)
FRAME NUMBER=2 ; LINE-OF-SIGHT CENTER COORDINATES=(1790, 512)
FRAME NUMBER=3 ; LINE-OF-SIGHT CENTER COORDINATES=(1785, 512)
FRAME NUMBER=4 ; LINE-OF-SIGHT CENTER COORDINATES=(1780, 512)
FRAME NUMBER=5 ; LINE-OF-SIGHT CENTER COORDINATES=(1775, 512)
FRAME NUMBER=6 ; LINE-OF-SIGHT CENTER COORDINATES=(1770, 512)
FRAME NUMBER=7 ; LINE-OF-SIGHT CENTER COORDINATES=(1765, 512)
FRAME NUMBER=8 ; LINE-OF-SIGHT CENTER COORDINATES=(1760, 512)
FRAME NUMBER=9 ; LINE-OF-SIGHT CENTER COORDINATES=(1755, 512)

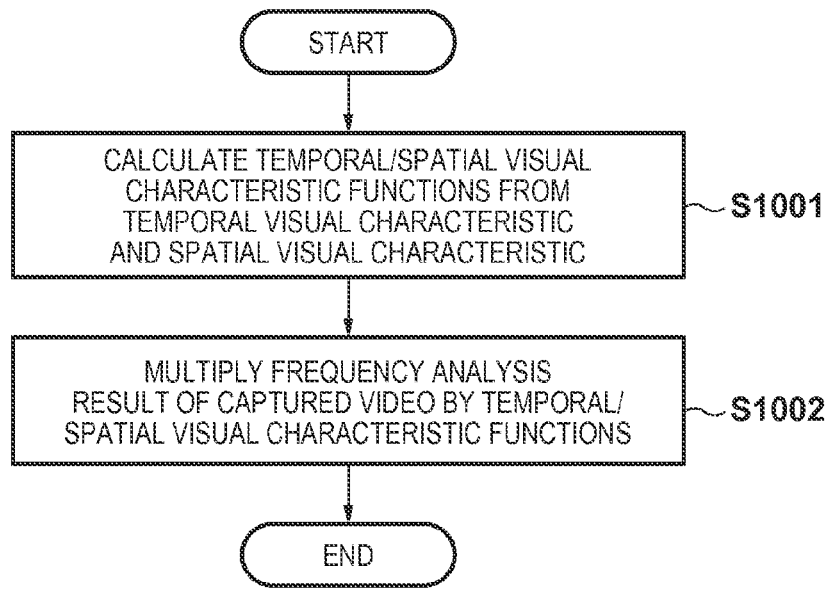
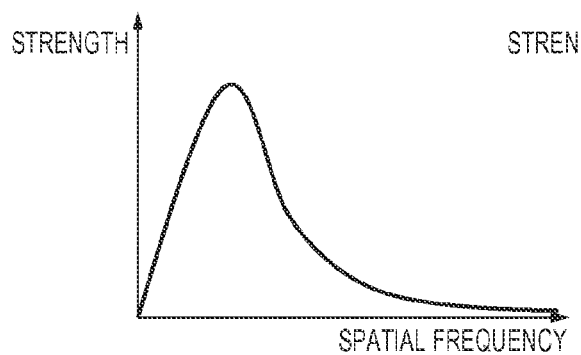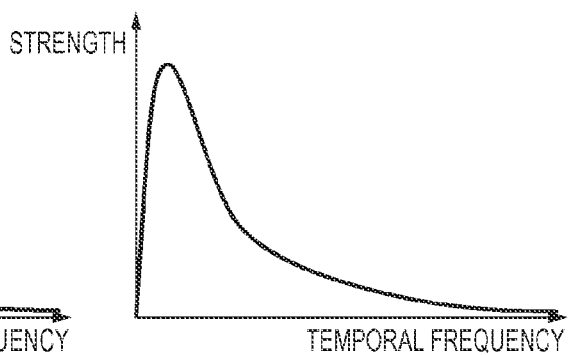

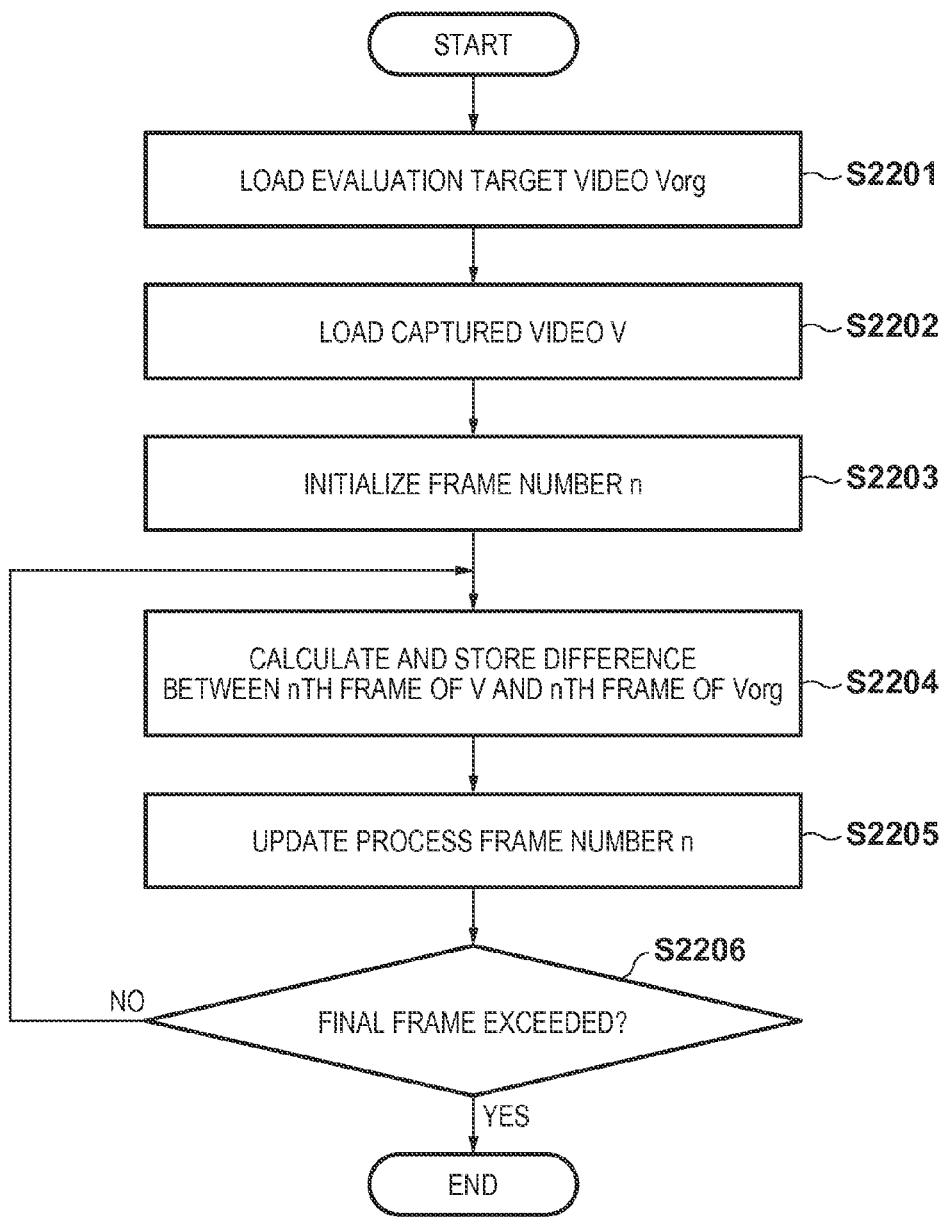
F I G. 22

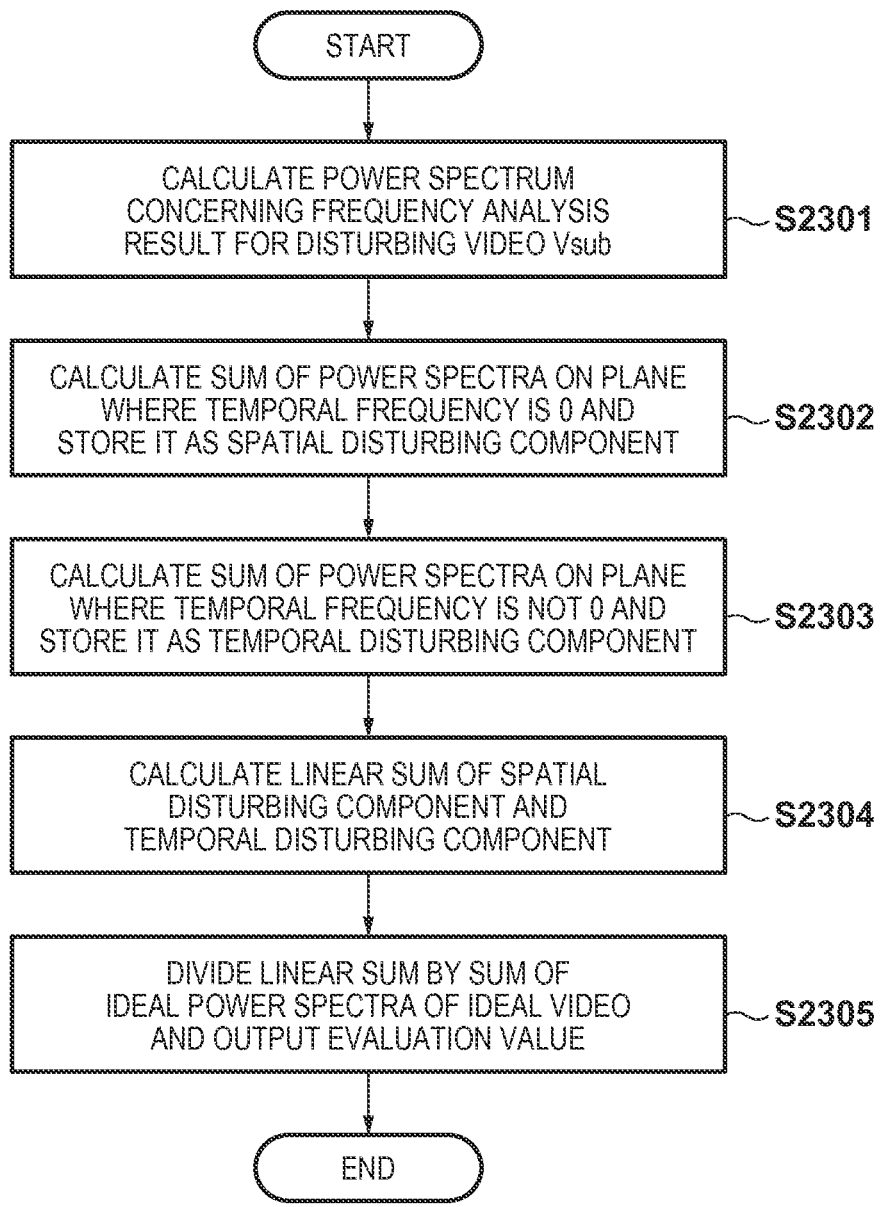

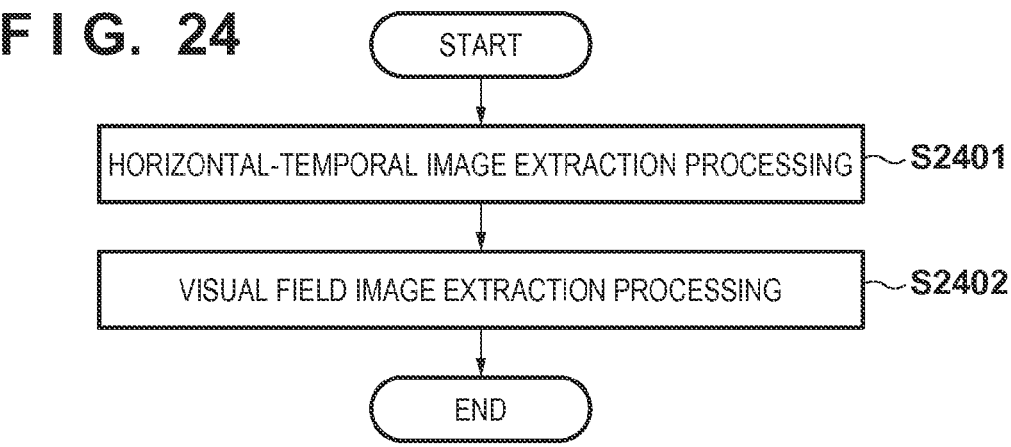
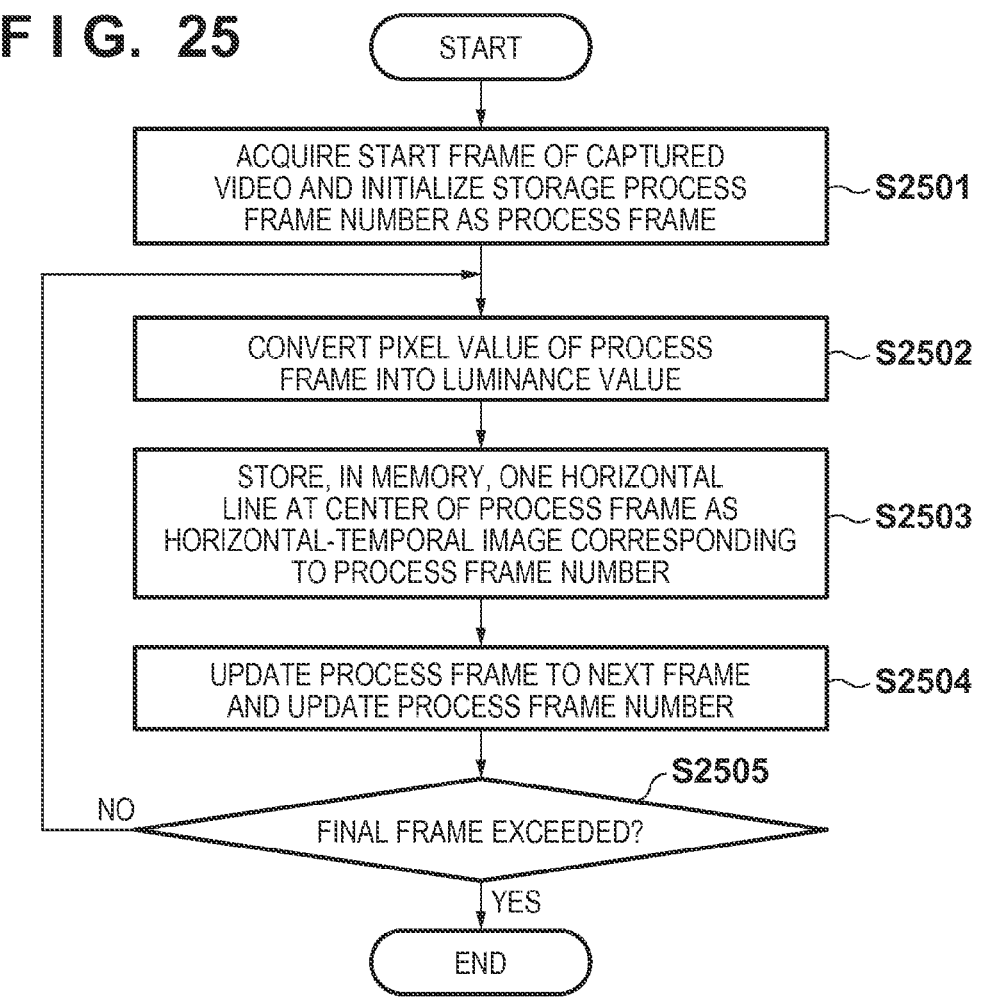

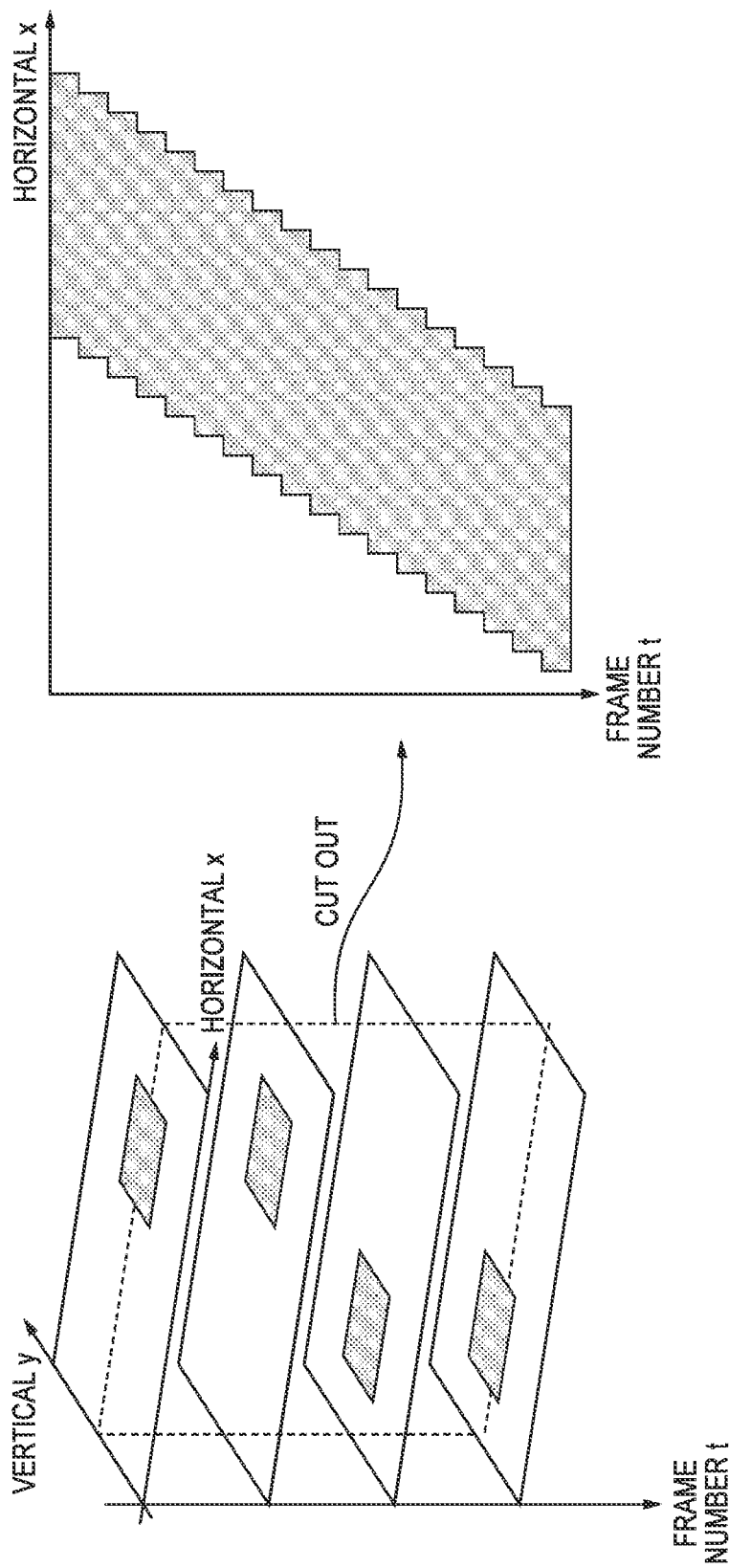

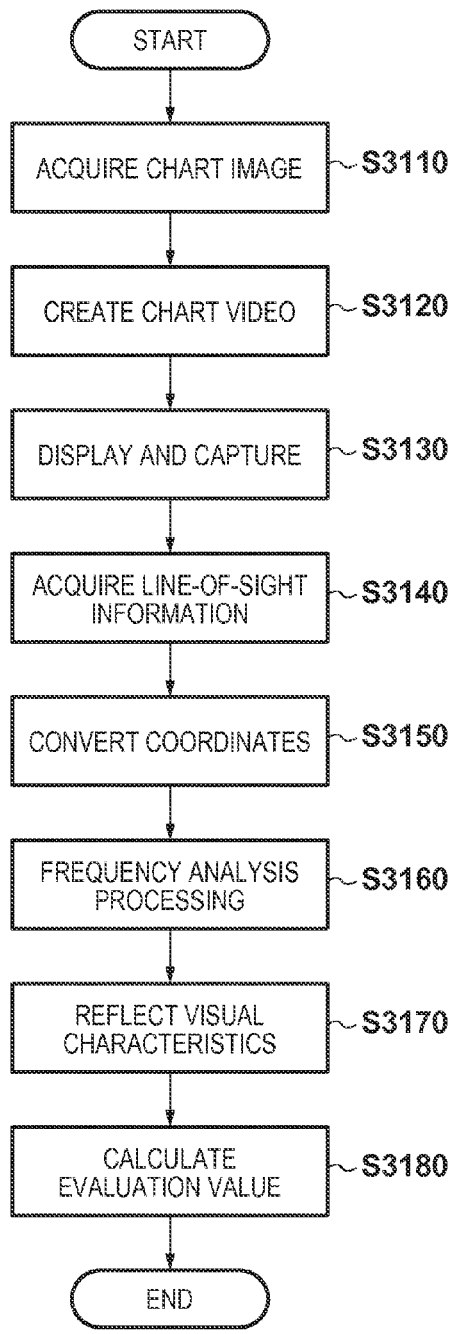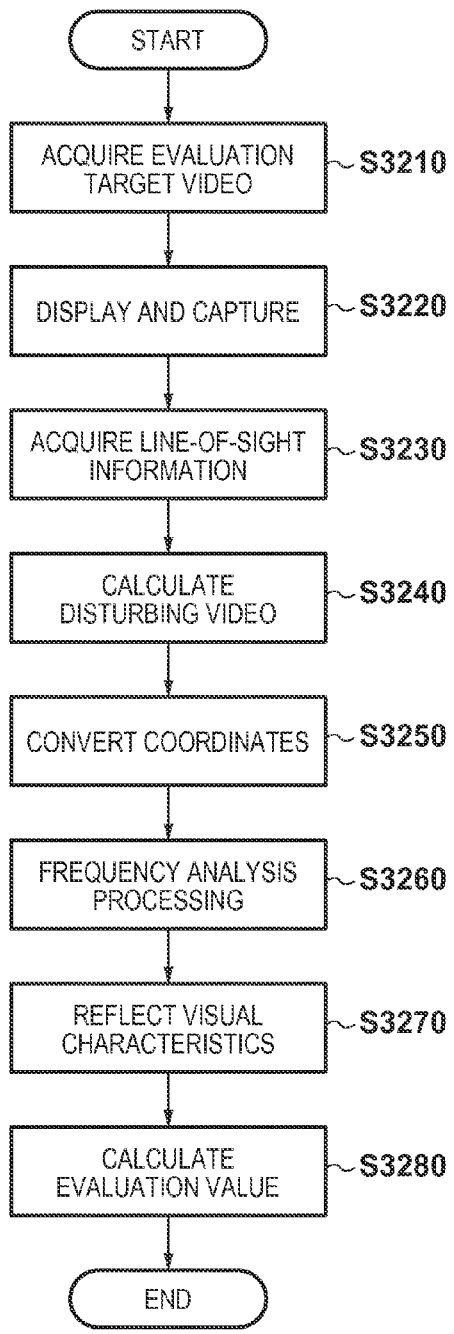

FIG. 39

EXAMPLE OF PARAMETER OPTIMIZATION RANGE FILE

FR=60;ss=1/60;NR_prm1=0.1;NR_prm2=0.2;Sharp_prm1=0.3···
FR=24;ss=1/60;NR_prm1=0.1;NR_prm2=0.2;Sharp_prm1=0.3···

APPARATUS, METHOD AND PROGRAM FOR DETERMINING THE SMOOTHNESS OF MOTION IN VIDEO DATA

BACKGROUND OF THE INVENTION

1. Field of the Invention

The present invention relates to a technique for evaluating the quality of a moving image and, more particularly, to a technique for evaluating the smoothness of the motion of a video formed from a plurality of frame images.

2. Description of the Related Art

Conventionally, various methods to evaluate the smoothness of the motion of a moving image have been made open to the public. The smoothness of a motion degrades due to, for example, motion discontinuity (judder or jerkiness) or a blur. One factor that degrades the smoothness of a motion is frame rate conversion of the video source. Japanese Patent Laid-Open No. 2008-072665 proposes a technique of quantitatively evaluating the degradation in the smoothness of a motion caused by the frame rate conversion. More specifically, according to Japanese Patent Laid-Open No. 2008-072665, the sum of powers of spatial frequencies in an image is calculated for each frame in accordance with the visual spatial bandwidth corresponding to the moving speed of an object, thereby calculating the evaluation value.

The display characteristic of a device also largely affects the smoothness of a motion. Japanese Patent Laid-Open No. 2005-333564 proposes a technique of quantitatively evaluating the degradation in the smoothness of a motion caused by the display characteristic of a device. In Japanese Patent Laid-Open No. 2005-333564, a camera captures a chart moving on a screen while following up it. The time response characteristic of the display is obtained from the blur amount of the acquired still image, thereby calculating the evaluation value.

In the method described in Japanese Patent Laid-Open No. 2008-072665, the sum of powers of spatial frequencies in an image is calculated for each frame. Hence, in the method described in Japanese Patent Laid-Open No. 2008-072665, if the motion vector of the object largely changes between frames, the evaluation accuracy may lower. According to the method described in Japanese Patent Laid-Open No. 2005-333564, since the motion of the chart is compiled to one still image, the time-rate change of the motion of the chart is not reflected on the evaluation value. To evaluate the quality of a moving image, it is necessary to obtain an accurate evaluation value that more highly correlates with the subjectivity.

SUMMARY OF THE INVENTION

The present invention enables to obtain a more accurate evaluation value in consideration of an image change between frame images when evaluating the quality of a moving image.

According to one aspect of the present invention, an information processing apparatus for calculating an evaluation value representing quality of a moving image comprises: a first acquisition unit configured to acquire data of an input moving image that includes a chart image in each frame image; a second acquisition unit configured to acquire position information representing a position of the chart image in each frame image of the input moving image; a cutout unit configured to cut out, from each frame image of the input moving image, a partial image including the chart image based on the position information and generate a converted moving image having the cutout partial image as a frame image; a conversion unit configured to frequency-convert the converted moving image at least in a temporal direction; and a calculation unit configured to calculate the evaluation value based on a frequency component value obtained by the conversion unit.

According to another aspect of the invention, an information processing method for calculating an evaluation value representing quality of a moving image comprises: acquiring data of an input moving image that includes a chart image in each frame image; acquiring position information representing a position of the chart image in each frame image of the input moving image; cutting out, from each frame image of the input moving image, a partial image including the chart image based on the position information and generate a converted moving image having the cutout partial image as a frame image; frequency-converting the converted moving image at least in a temporal direction; and calculating the evaluation value based on a frequency component value obtained in the conversion step.

According to the aspects of the invention, a more accurate evaluation value can be obtained in consideration of an image change between frame images when evaluating the quality of a moving image.

Further features of the present invention will become apparent from the following description of exemplary embodiments (with reference to the attached drawings).

BRIEF DESCRIPTION OF THE DRAWINGS

FIG. 5 is a flowchart showing the operation of a chart video creation unit according to the first embodiment;

FIG. 6 is a view showing an example of a line-of-sight information calculation result;

FIG. 10 is a flowchart showing the operation of a visual characteristic reflection unit according to the first embodiment;

FIGS. 11A and 11B are schematic graphs of visual characteristics;

FIG. 22 is a flowchart showing the operation of a difference calculation unit according to the fifth embodiment;

FIG. 23 is a flowchart showing the operation of an evaluation value calculation unit according to the fifth embodiment;

FIG. 24 is a flowchart showing the operation of a coordinate conversion unit according to the sixth embodiment;

FIG. 25 is a flowchart showing the operation of the coordinate conversion unit according to the sixth embodiment;

FIGS. 26A and 26B are schematic views for explaining horizontal-temporal image generation processing;

FIGS. 31A and 31B are flowcharts of processing unit according to the first and fifth embodiments;

FIG. 39 is a view showing an example of a parameter optimization range file used in the eighth embodiment;

DESCRIPTION OF THE EMBODIMENTS

The embodiments of the present invention will now be described with reference to the accompanying drawings. However, the scope of the present invention is not limited to the following embodiments.

First Embodiment

A video evaluation apparatus 101 that is an information processing apparatus according to the first embodiment calculates an evaluation value representing the quality of moving image display on a display 102. More specifically, the video evaluation apparatus 101 calculates an evaluation value representing the smoothness of a moving image displayed on the display. According to this embodiment, it is possible to evaluate the influence of the display characteristic of the display on the smoothness of a motion. According to the first embodiment, it is possible to evaluate the quality of a moving image at a high accuracy by considering the correlation between frames. More specifically, an image in the visual field of the observer is extracted from each frame of a video. At least frequency components in the temporal direction are calculated for the extracted video, thereby calculating the temporal disturbing components of the smoothness of the motion.

Figure 1:
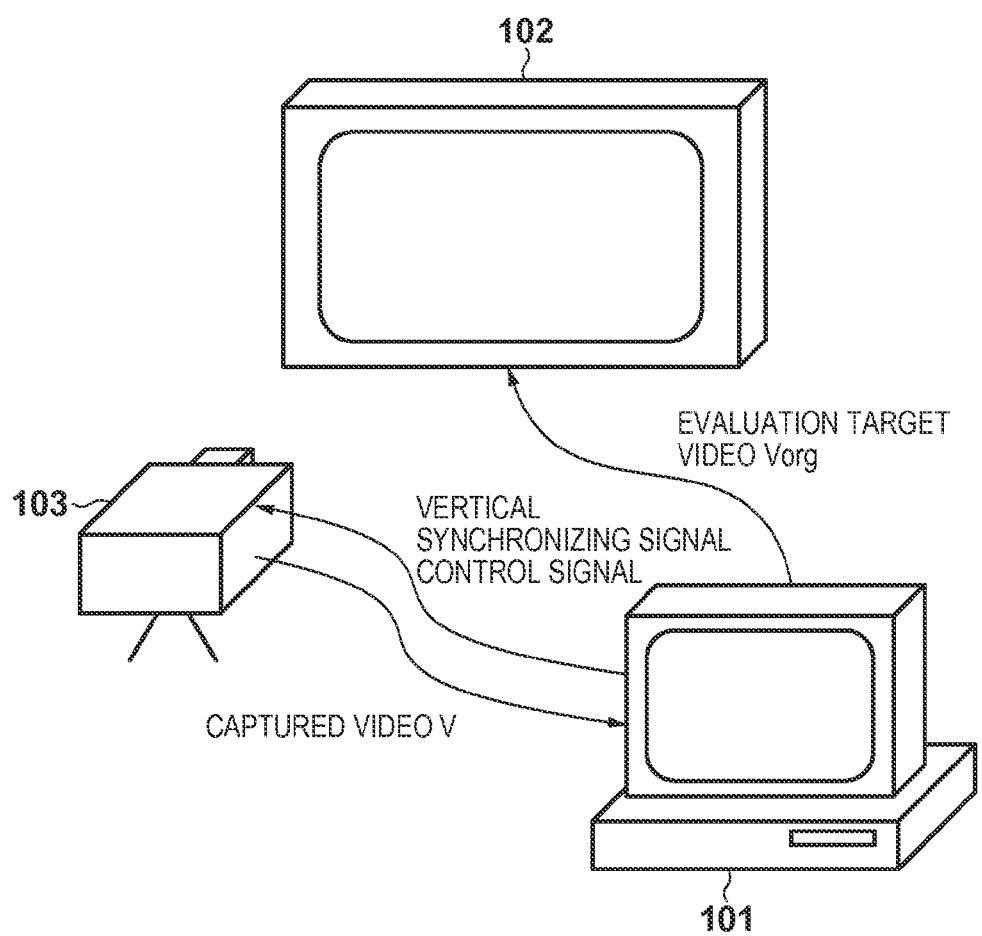
FIG. 1 is a view showing an example of the arrangement of a video evaluation system according to the first embodiment.

Processing to be executed by the video evaluation apparatus 101 according to this embodiment will be described with reference to FIG. 1. The video evaluation apparatus 101 first outputs a chart video Vorg to the display 102. An image capturing apparatus 103 captures the chart video Vorg displayed on the display 102. The video evaluation apparatus 101 receives the moving image captured by the image capturing apparatus 103 and calculates an evaluation value representing the smoothness of the motion of the moving image. In this embodiment, the video evaluation apparatus 101 performs both output of the chart video Vorg and calculation of the evaluation value. However, output of the chart video Vorg and calculation of the evaluation value may be done by separate apparatuses.

The display 102 receives the chart video Vorg from the video evaluation apparatus 101, as described above, and displays the chart video Vorg on the panel. The image capturing apparatus 103 can receive a vertical synchronizing signal or a control signal from the video evaluation apparatus 101. The image capturing apparatus 103 can thus capture a video in synchronism with the display timing of the display 102. The image capturing apparatus 103 transfers a captured video V obtained as the result of capturing to the video evaluation apparatus 101.

The chart video Vorg will be explained next. As described above, the video evaluation apparatus 101 evaluates display of the chart video Vorg by the display 102. The chart video Vorg according to this embodiment is a moving image in which a predetermined chart image moves on the screen. More specifically, a moving image in which a predetermined chart image moves in the horizontal direction is used as the chart video Vorg of this embodiment.

<Arrangement of Video Evaluation Apparatus 101>

The arrangement of the video evaluation apparatus 101 will be described with reference to FIG. 2. A CPU 201 controls the operation of the entire video evaluation apparatus 101. More specifically, the CPU 201 can acquire a user instruction via an input device such as a keyboard 202 or a mouse 203. The CPU 201 can also control reproduction, capturing, and evaluation of a moving image. The video evaluation apparatus 101 is connected to the image capturing apparatus 103. The CPU 201 can transfer data to the image capturing apparatus 103 and control the image capturing apparatus 103. The display 102 is similarly connected to the video evaluation apparatus 101. The CPU 201 can display, on a display 204, an evaluation value calculated by an evaluation value calculation unit 214. The operation of the CPU 201 can be implemented by loading a computer program recorded in a storage medium such as an HDD 205 to a memory such as a RAM 230 and causing the CPU 201 to operate in accordance with the program.

The units of the video evaluation apparatus 101 will briefly be described next while explaining the outline of the operation to be performed by the video evaluation apparatus 101 with reference to the flowchart of FIG. 31A. In step S3110, an information setting unit 206 acquires a chart image c included in the chart video Vorg (third acquisition unit). More specifically, the information setting unit 206 receives a designation of the chart image c from the user via the keyboard 202 or the mouse 203. For example, the user designates a file path to the storage location of the chart image c. Upon receiving this designation, the CPU 201 reads out the chart image c from the HDD 205. The information setting unit 206 receives the chart image c from the CPU 201 and transfers it to a chart video creation unit 207.

In step S3120, the chart video creation unit 207 creates the chart video Vorg including the chart image c. In step S3130, a video output unit 208 displays the chart video Vorg (display moving image) on the display 102. The image capturing apparatus 103 captures the chart video Vorg displayed on the display 102. At this time, a video acquisition unit 209 can control the operation of the image capturing apparatus 103. The video acquisition unit 209 receives, from the image capturing apparatus 103, the captured video V (input moving image) captured by it (first acquisition unit).

Using the captured video V and the chart image c which are obtained in the above-described way, the video evaluation apparatus 101 calculates an evaluation value representing the smoothness of the motion of the moving image. This processing is performed by various units including a line-of-sight calculation unit 210, a coordinate conversion unit 211, a frequency analysis unit 212, a visual characteristic reflection unit 213, and the evaluation value calculation unit 214.

In step S3140, the line-of-sight calculation unit 210 obtains line-of-sight information e for the captured video V (second acquisition unit). The line-of-sight information is information about the line-of-sight center of a human who views the chart video Vorg. More specifically, the line-of-sight information describes the coordinates of the line-of-sight center for each frame image of the captured video V.

In step S3150, the coordinate conversion unit 211 loads the captured video V and the line-of-sight information e and cuts out a portion corresponding to the visual field from each frame image of the captured video V (cut-out unit). This cut-out processing corresponds to coordinate conversion processing. When a human looks at a moving object, he/she does following viewing so as to view the object at the center of the retina. By the coordinate conversion processing, the coordinate conversion unit 211 can reproduce the video to be formed on the retina of the human. More specifically, the coordinate conversion unit 211 performs coordinate conversion for each frame image such that the line-of-sight center represented by the line-of-sight information e for each frame image is located at predetermined coordinates. The coordinate conversion unit 211 thus generates a coordinate conversion result V' (converted moving image) from the captured video V.

In step S3160, the frequency analysis unit 212 performs frequency analysis processing (frequency conversion processing) for the coordinate conversion result V' obtained by the coordinate conversion unit 211 (conversion unit). More specifically, the frequency analysis unit 212 performs three-dimensional Fourier transformation for the coordinate conversion result V', thereby obtaining a frequency analysis result Fv(u, v, f), where u is the spatial frequency (unit is cycles/degree) in the horizontal direction, v is the spatial frequency (unit is cycles/degree) in the vertical direction, and f is the temporal frequency (unit is Hz). In this embodiment, the frequency analysis unit 212 calculates the frequencies of the coordinate conversion result V' in the spatial and temporal directions using three-dimensional Fourier transformation. However, the frequency analysis unit 212 may calculate the frequencies using another frequency analysis method such as wavelet transformation.

In step S3170, the visual characteristic reflection unit 213 performs processing of reflecting the visual characteristics on the frequency analysis result Fv calculated by the frequency analysis unit 212. More specifically, the visual characteristic reflection unit 213 multiplies Fv(u, v, f) by the temporal/spatial visual characteristics, thereby calculating $F1(u, v, f)$. In this way, the visual characteristic reflection unit 213 weights the frequency analysis result Fv using a visual characteristic function based on the visual characteristics of the observer who observes the display. This processing allows to extract a frequency component perceivable by a human out of the frequency analysis result Fv. In another embodiment, the visual characteristic reflection unit 213 may perform a convolution operation using a filter coefficient representing the visual characteristics for the coordinate conversion result V', instead of multiplying the coordinate conversion result V' by the temporal/spatial visual characteristics.

In step S3180, the evaluation value calculation unit 214 calculates an evaluation value using $F1(u, v, f)$ and the chart image c (calculation unit). More specifically, the evaluation value calculation unit 214 extracts disturbing components by calculating the difference between the power spectrum of $F1(u, v, f)$ and that of the chart image c. The evaluation value representing the smoothness of the motion is calculated based on the frequency component amounts of the disturbing components.

Each processing unit provided in the video evaluation apparatus 101 will be described below in more detail.

<Information Setting Unit 206>

Figure 3:
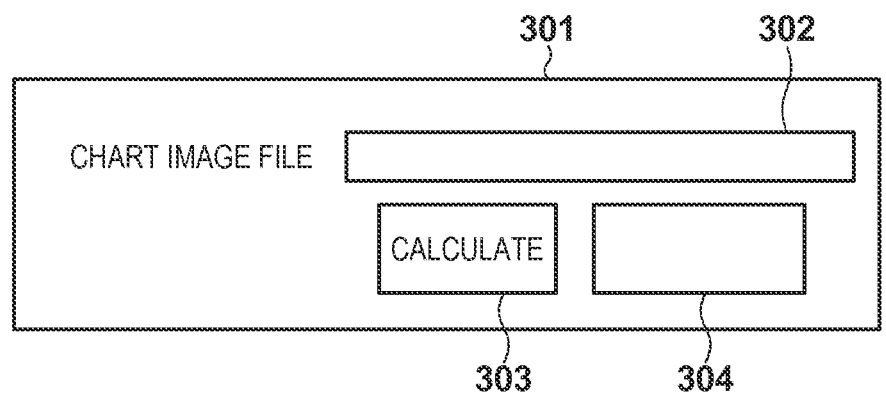
FIG. 3 is a schematic view showing a window to be used by an information setting unit according to the first embodiment.

The information setting unit 206 acquires the chart image c included in the chart video Vorg. The information setting unit 206 can acquire a user input representing the chart image c in the following way. An example of a method of causing the information setting unit 206 to acquire the chart image will be described below. However, the chart image acquisition method is not limited to this. FIG. 3 illustrates an example of a GUI to be used by the information setting unit 206 to acquire a user input representing the chart image c. The information setting unit 206 displays an application window 301 on the display 204. The user inputs, to a form 302, the file path of a chart image file stored in the HDD 205. The information setting unit 206 acquires the chart image file containing the chart image c from the HDD 205 in accordance with the file path input to the form 302.

Figure 4:
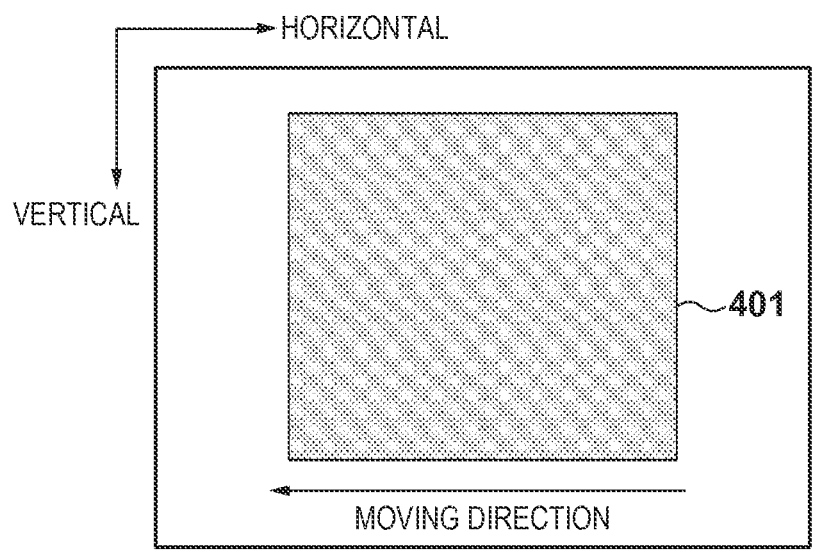
FIG. 4 is a schematic view of a chart video Vorg according to the first embodiment.

FIG. 4 shows an example of the chart image c. As shown in FIG. 4, the chart image c includes a chart 401. However, the chart image c can include any chart, for example, a natural image. The user can instruct to start evaluation value calculation processing by clicking the mouse 203 on a button 303. When the user instructs to start the processing, capturing and evaluation processing of the chart video Vorg starts. The calculated evaluation value is displayed in the form 304.

<Chart Video Creation Unit 207>

The chart video creation unit 207 creates the chart video Vorg including the chart image c. The operation of the chart video creation unit 207 will be described below with reference to the flowchart of FIG. 5. In step S501, the chart video creation unit 207 acquires the chart image c from the information setting unit 206. In step S502, the chart video creation unit 207 initializes the process frame number. More specifically, the chart video creation unit 207 sets 0 to the process frame number.

In step S503, the chart video creation unit 207 performs horizontal shift operation processing for the chart image c. In this embodiment, the chart image is shifted leftward. The chart video creation unit 207 stores the shifted chart image c as the frame image of the frame indicated by the process frame number. Letting vx [pixels/frame] be the horizontal moving speed of the chart image c, the horizontal shift amount of the nth frame is given by shift(n)=−vx·n. That is, in step S503, the chart video creation unit 207 horizontally moves the chart image c by vx pixels.

In step S504, the chart video creation unit 207 updates the process frame number. More specifically, 1 is added to the process frame number. In step S505, the chart video creation unit 207 determines whether the process frame number has exceeded the final frame number. If the process frame number has not exceeded the final frame number, the process returns to step S503. If the process frame number has exceeded the final frame number, the processing ends. The final frame number represents the number of frames of the chart video Vorg and is set in advance.

With the above-described processing, the chart video Vorg is created in which the chart image c moves in the horizontal direction at the speed vs [pixels/frame]. The chart video creation unit 207 may add frame rate information representing the frame rate to the chart video Vorg. The frame rate of the chart video Vorg can be set to a value corresponding to the driving frequency of the display 102.

<Video Output Unit 208 and Video Acquisition Unit 209>

The video output unit 208 displays the chart video Vorg on the display 102. That is, the video output unit 208 transfers the chart video Vorg created by the chart video creation unit 207 to the display 102. Reproduction of the evaluation video Vorg thus starts on the display 102. At this time, the display 102 operates at a driving frequency corresponding to the frame rate information of the chart video Vorg.

The video acquisition unit 209 sends control signals concerning the start and end of image capturing to the image capturing apparatus 103. In accordance with the control signal that instructs the start of image capturing, the image capturing apparatus 103 starts image capturing. In addition, the video acquisition unit 209 can output a vertical synchronizing signal to the image capturing apparatus 103. The vertical synchronizing signal can have a frequency corresponding to the frame rate information of the chart video Vorg. The image capturing apparatus 103 controls the shutter timing in synchronism with the vertical synchronizing signal. The image capturing apparatus 103 can thus perform image capturing such that the exposure time of one process does not extend over the display frames of the display 102. That is, the image capturing apparatus 103 can separately capture the frame images displayed on the display 102.

In accordance with the control signal instructing the end of image capturing, the image capturing apparatus 103 ends image capturing. In addition, the video output unit 208 stops transferring the chart video Vorg to the display 102. The video V captured by the image capturing apparatus 103 is input to the video acquisition unit 209.

<Line-of-Sight Calculation Unit 210>

The line-of-sight calculation unit 210 acquires the line-of-sight information e for the captured video V. As described above, the line-of-sight information e includes the line-of-sight center coordinates of each frame. In this embodiment, the line of sight of a human is assumed to be located at the center of the chart 401 included in each frame of the chart video Vorg. That is, the center coordinates of the chart 401 are set as the line-of-sight center coordinates of each frame. More specifically, in this embodiment, line-of-sight center coordinates (ex(t), ey(t)) for a frame number t are represented by $$ex(t)=Cx+vx·t$$

$$ey(t)=Cy$$

Let vx be the horizontal moving speed of the chart image c. Additionally, let (Cx, Cy) be the center coordinates of the chart 401 included in the chart image c in the first frame image of the chart video Vorg.

The horizontal moving speed vx of the chart can be the same as the value used in the chart video creation processing. The line-of-sight calculation unit 210 may calculate the moving speed vx from the chart image c and the captured video V. More specifically, the chart image c may be aligned with each frame of the captured video V, thereby calculating the moving speed vx. For example, the average of the misalignment amounts of the chart image c between the continuous frames can be used as the moving speed vx. The line-of-sight calculation unit 210 thus acquires the line-of-sight information e (position information) representing the position of the chart 401 in each frame image of the captured video V.

An example of calculated line-of-sight information is shown in FIG. 6. FIG. 6 shows line-of-sight information when the center coordinates of the line of sight move leftward by 5 pixels in each frame. Referring to FIG. 6, "frame number" represents the number of frames from the start frame of the captured video V. In addition, "line-of-sight center coordinates" represent the line-of-sight center coordinates in each frame, and the coordinate values are described next to the equal sign. Line-of-sight center coordinates correspond to the coordinates of a frame image of the captured video V and are described in the form (w, h), where w is the coordinate in the horizontal direction, and h is the coordinate in the vertical direction.

<Coordinate Conversion Unit 211>

Figure 7:
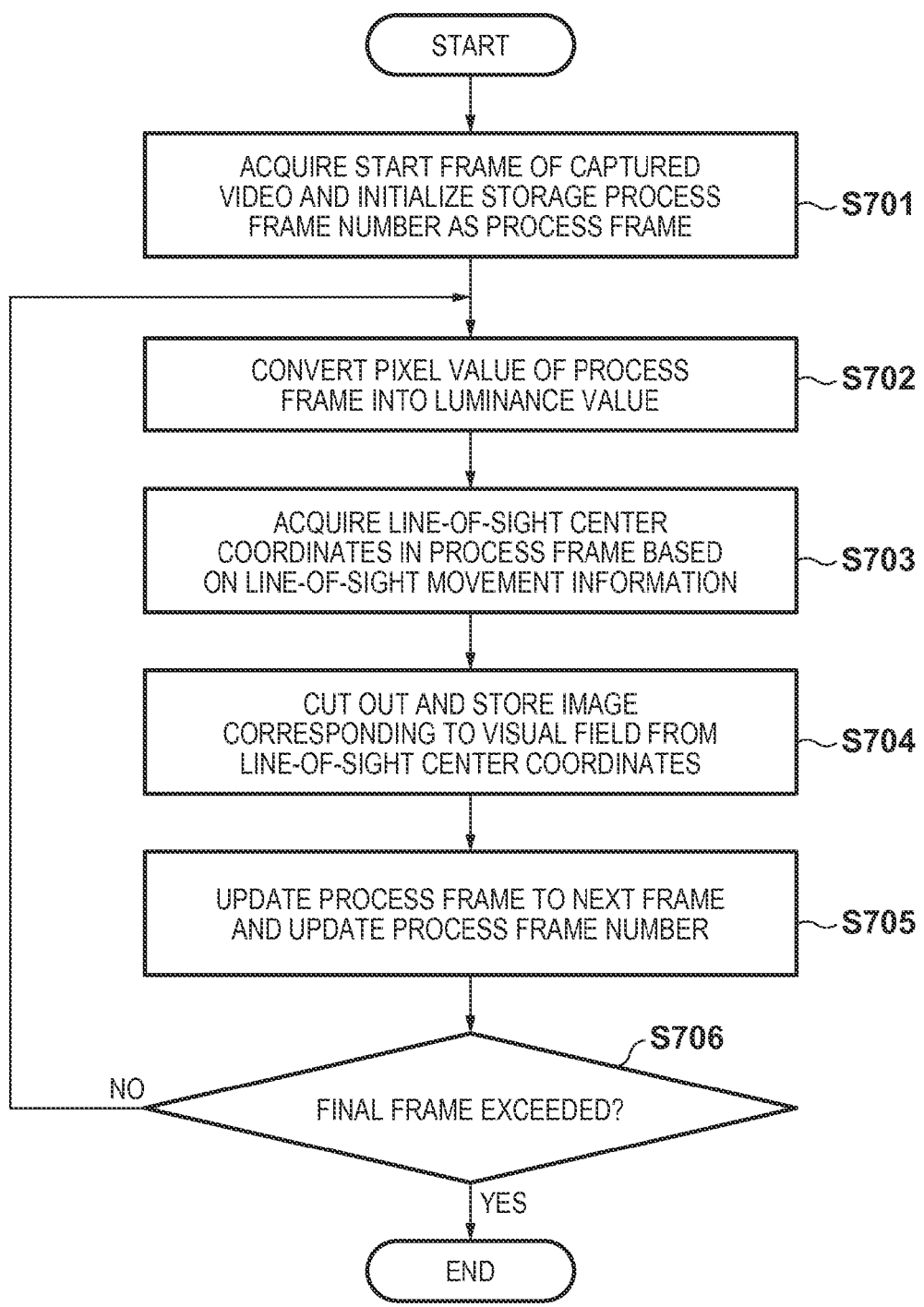
FIG. 7 is a flowchart showing the operation of a coordinate conversion unit according to the first embodiment.

The coordinate conversion unit 211 cuts out an image region corresponding to the visual field from each frame image of the captured video V. The coordinate conversion unit 211 will be explained below in detail with reference to the flowchart of FIG. 7. In step S701, the coordinate conversion unit 211 acquires the start frame of the captured video V as the process frame. The coordinate conversion unit 211 also initializes the process frame number t. More specifically, the coordinate conversion unit 211 sets 0 to the process frame number t.

In step S702, the coordinate conversion unit 211 converts the pixel value of each pixel included in the process frame into a luminance value. For example, when the correspondence between a pixel value and a luminance value in the image capturing apparatus 103 is recorded in advance, the coordinate conversion unit 211 can convert a pixel value into a luminance value using the correspondence. The correspondence can be recorded as, for example, a lookup table. However, converting the pixel value into a luminance value is not essential. The pixel value may directly be used or converted into another color value such as a brightness value. In step S703, the coordinate conversion unit 211 acquires the lineof-sight center coordinates (ex(t), ey(t)) corresponding to the process frame number t by referring to the line-of-sight information e received from the line-of-sight calculation unit.

Figure 8:
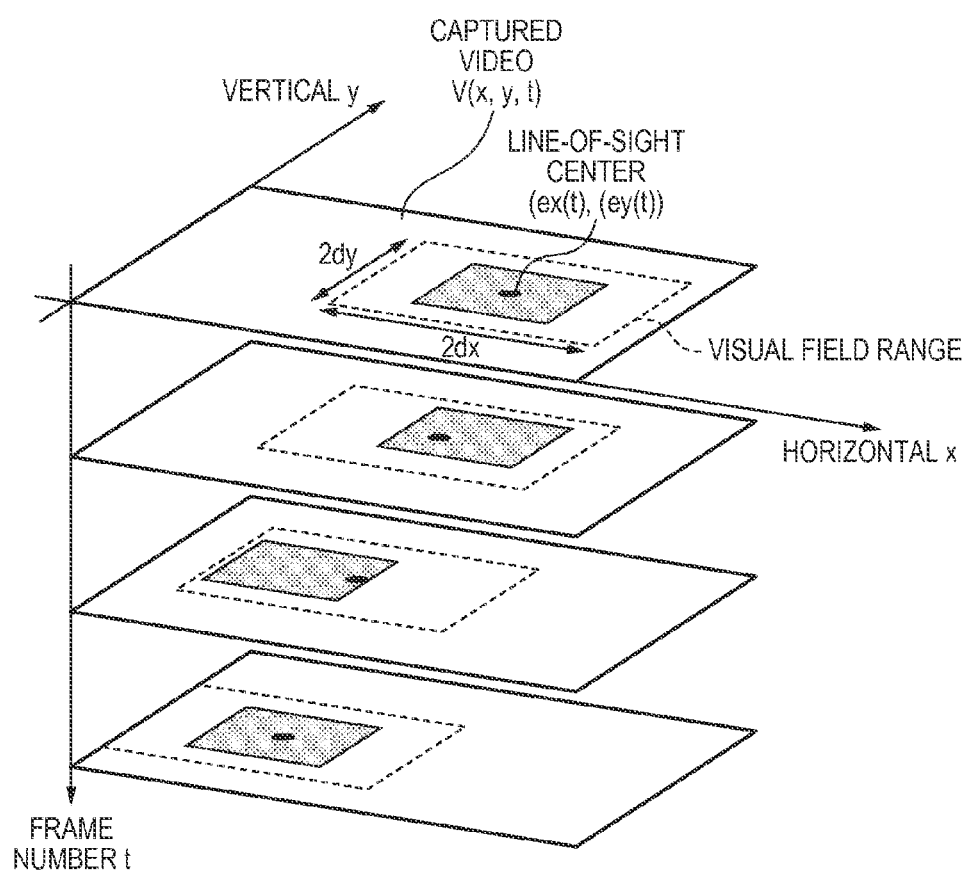
FIG. 8 is a schematic view of a captured video V.
Figure 9:
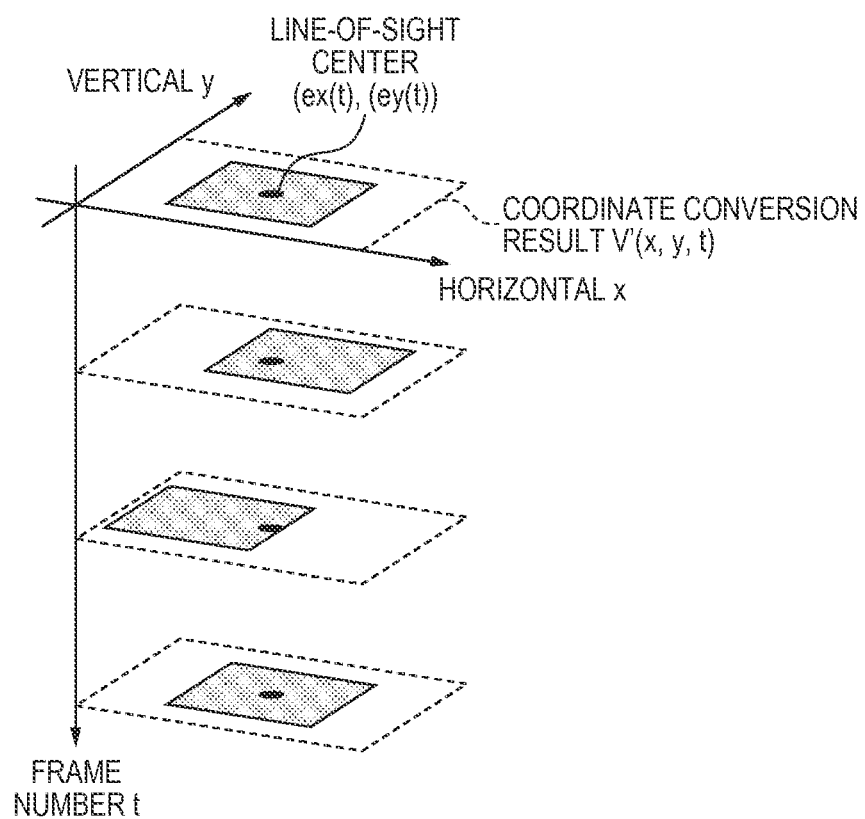
FIG. 9 is a schematic view of a coordinate conversion result V'.

In step S704, the coordinate conversion unit 211 extracts, from the process frame after conversion of step S702, an image in a region having the line-of-sight center coordinates (ex(t), ey(t)) at its center and a size of 2dx+1 pixels in the horizontal direction and 2dy+1 pixels in the vertical direction. The extracted image is the coordinate conversion result V'(x, y, t). The values dx and dy can be set such that, for example, when the extracted image is displayed on the display 102, the displayed image corresponds to the visual field with an angle of 2° for the horizontal direction and the vertical direction when viewed from the image capturing apparatus 103. FIG. 8 is a schematic view of the captured video V(x, y, t) when the horizontal direction is expressed as x, the vertical direction as y, and the process frame as t. FIG. 9 is a schematic view of V'(x, y, t).

In this embodiment, V'(x, y, t) is extracted by $(x,y,t)=V'(x-ex(t),y-ey(t),t)$

In this case, the ranges of x and y are represented by $ex(t)-dx \leq x \leq ex(t)+dx$ $ey(t)-dy \leq y \leq ey(t)+dy$ As described above, in this embodiment, the line-of-sight center coordinates correspond to the position of the chart 401. Hence, a partial image including the chart 401 is cut out from the captured video V.

In step S705, the coordinate conversion unit 211 updates the process frame number t. More specifically, the coordinate conversion unit 211 adds 1 to the process frame number t. In step S706, the coordinate conversion unit 211 determines whether the process frame number t has exceeded the final frame number. If the process frame number t has not exceeded the final frame number, the process returns to step S702. If the process frame number t has exceeded the final frame number, the processing in FIG. 7 ends.

<Visual Characteristic Reflection Unit 213>

The visual characteristic reflection unit 213 performs processing of reflecting the visual characteristics on the frequency analysis result Fv calculated by the frequency analysis unit 212. The operation of the visual characteristic reflection unit 213 will be described below in detail with reference to the flowchart of FIG. 10. In step S1001, the visual characteristic reflection unit 213 acquires a visual characteristic function. The visual characteristic function may be created in advance and stored in a storage unit such as the HDD 205.

An example of the visual characteristic function usable in this embodiment will be described below. The visual characteristic function used in this embodiment is obtained by multiplying the spatial frequency visual characteristic shown in FIG. 11A by the temporal frequency visual characteristic shown in FIG. 11B. That is, the temporal/spatial visual characteristic function Vtf(u, v, f) used in this embodiment is given by $Vtf(u,v,f)=T(f) \cdot S(u) \cdot S(v)$ where T is the function representing the visibility characteristic to the temporal frequency [Hz], and S is the function representing the visibility characteristic to the spatial frequency [cycles/degree].

In this embodiment, the Kelly's temporal VTF is used as the function T, and the Dooley's spatial VTF is used as the function S. More specifically, the functions T and S are represented by $T(f)=4.02*(1-0.85*\exp(-0.1*f))*\exp(-0.138*f)$ $S(u)=5.05*(1-\exp(-0.1*u))*\exp(-0.138*u)$ In step S1002, the visual characteristic reflection unit 213 multiplies the frequency analysis result Fv by the visual characteristic function. More specifically, using the frequency analysis result Fv and the visual characteristic function Vtf, the frequency analysis result F1 on which the visual characteristics are reflected is represented by $F1(u,v,f)=Fv(u,v,f)*Vtf(u,v,f)$ <Evaluation Value Calculation Unit 214>

The evaluation value calculation unit 214 calculates the evaluation value using the chart image c and the frequency analysis result F1(u, v, f) on which the visual characteristics are reflected. This processing includes disturbing component extraction processing and evaluation value calculation processing. The evaluation value calculation unit 214 first extracts disturbing components by calculating the difference between the temporal frequency power spectrum on which the visual characteristics are reflected and the power spectrum of the chart image. When the power spectrum difference is calculated, a frequency power that is not included in the chart image is extracted as a disturbing component.

Figure 12:
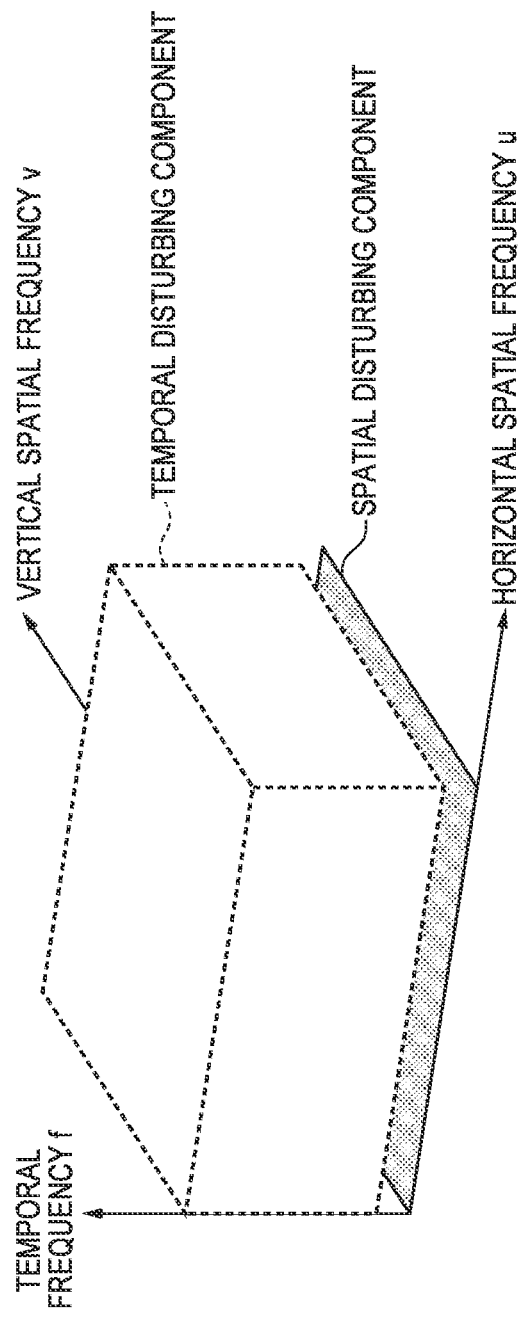
FIG. 12 is a schematic view showing temporal disturbing components and spatial disturbing components according to the first embodiment.

The evaluation value calculation unit 214 then calculates frequency components for which the temporal frequency is 0 as spatial disturbing components and components in other regions as temporal disturbing components out of the extracted disturbing components. The evaluation value calculation unit 214 calculates the linear sum of the spatial disturbing components and the temporal disturbing components, thereby calculating the quantitative evaluation value. FIG. 12 is a schematic view of the spatial disturbing components and the temporal disturbing components.

As shown in FIG. 12, a spatial disturbing component is a frequency component on the u-v frequency plane where the temporal frequency f=0 and has no temporal frequency component. This corresponds to an image degradation component such as a blur or a multiple image in a still image. On the other hand, a temporal disturbing component is a frequency component in a space other than the u-v frequency plane where f=0 and has a temporal frequency component, as shown in FIG. 12. This corresponds to an image degradation in the temporal direction such as a stagger (jerkiness or judder) or flicker caused by motion discontinuity.

Figure 13:
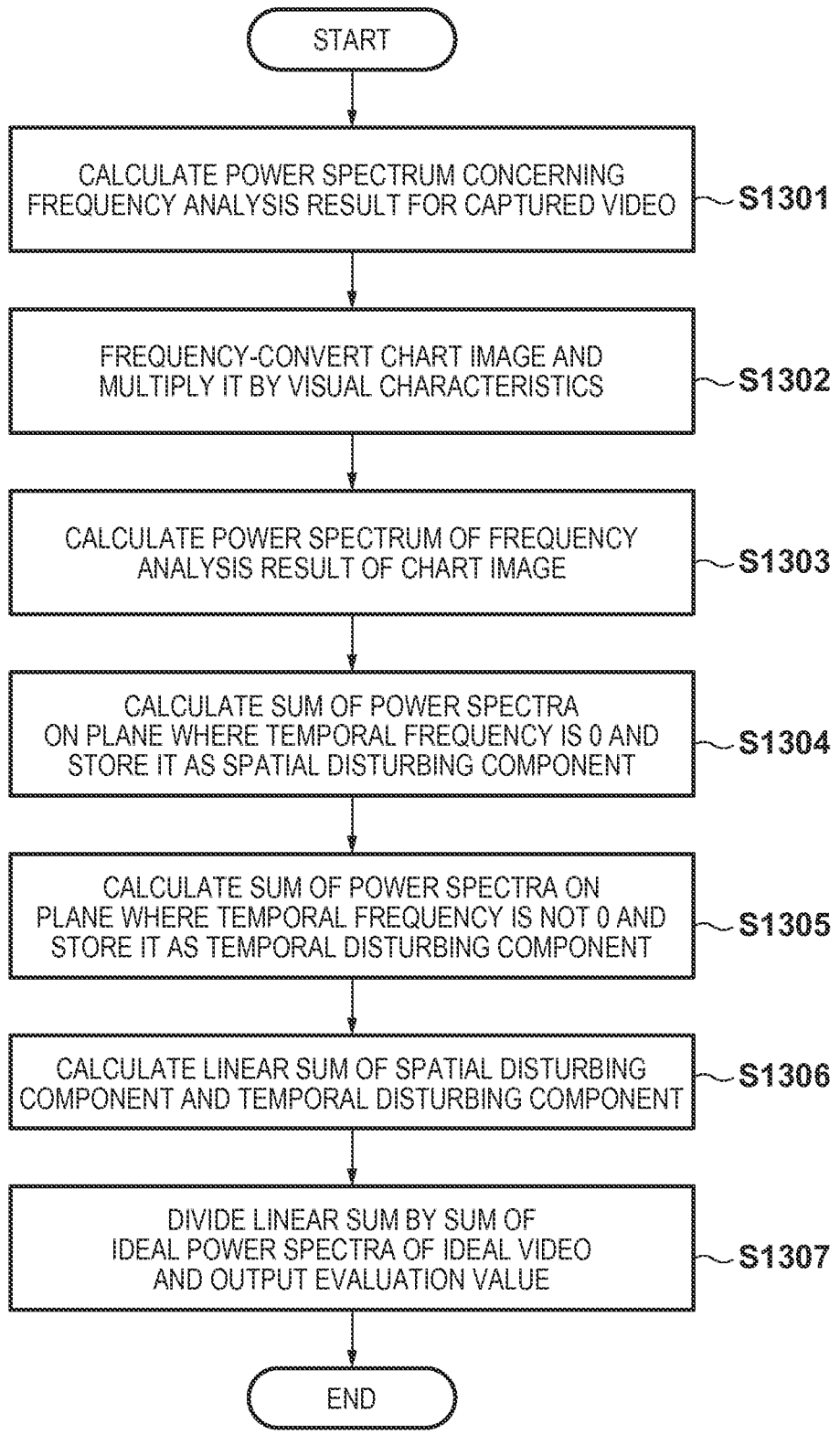
FIG. 13 is a flowchart showing the operation of an evaluation value calculation unit according to the first embodiment.

A detailed procedure of evaluation value calculation will be described in detail with reference to the flowchart of FIG. 13. In step S1301, the evaluation value calculation unit 214 calculates the signal strength value |F1(u, v, f)| of the frequency analysis result F1(u, v, f) calculated by the visual characteristic reflection unit 213.

Figure 14:
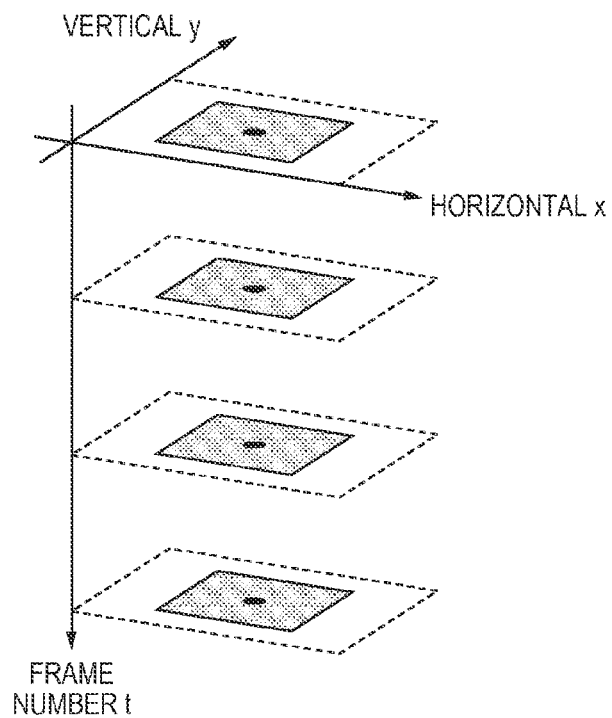
FIG. 14 is a schematic view of a video without moving image degradation corresponding to the captured video V.

In step S1302, the evaluation value calculation unit 214 calculates a frequency analysis result Fref(u, v, f) when the display 102 displays the captured video V without image degradation. In this embodiment, if there is no image degradation (moving image degradation), the chart image c is displayed at the same position in the frames of the captured video V. That is, if no image degradation exists, the center of the chart always matches the line-of-sight center, as shown in FIG. 14. In this case, no frequency component in the temporal direction exists. Hence, the evaluation value calculation unit 214 calculates a frequency analysis result F2(u, v) when f=0 in the following way.

The evaluation value calculation unit 214 creates a comparative image including the chart image c at a predetermined position and having the same size as that of the captured video V and performs Fourier transformation for the comparative image. The comparative image corresponds to an image in the visual field of a human when the display 102 displays the captured video V without image degradation. In this embodiment, the line-of-sight center coordinates is located at the center of the chart 401 included in the chart image c. Hence, the comparative image is created by performing a shift operation for the chart image c such that the center coordinates of the comparative image match the center of the chart 401. The comparative image may undergo resolution conversion processing so that the comparative image and the captured video V have the same image size and resolution. The evaluation value calculation unit 214 further performs two-dimensional Fourier transformation for the obtained comparative image, thereby obtaining a Fourier transformation result Fc(u, v).

The evaluation value calculation unit 214 multiplies the obtained Fourier transformation result Fc(u, v) by the visual characteristics. A visual characteristic function Vtf2 used here is represented by $$Vtf2(u,v)=T(0) \cdot S(u) \cdot S(v)$$

where S(u) and S(v) are the same functions as those used by the visual characteristic reflection unit 213. Since the comparative image and the captured video V have the same image size, the unit of Fc(u, v) is the same as that of the frequency analysis result Fv(u, v, f) of the captured video V. Hence, the evaluation value calculation unit 214 obtains F2($u$, $v$) by multiplying Fc(u, v) by the visual characteristics in accordance with $$F2(u,v)=Fc(u,v)*Vtf2(u,v)$$

Using the thus calculated F2($u$, $v$), the frequency analysis result Fref(u, v, f) is given by $$Fref(u, v, f) = F2(u, v)(f = 0)$$
$$= 0 (f \neq 0)$$

In this embodiment, the evaluation value calculation unit 214 calculates F2($u$, $v$) in the above-described manner. In this embodiment, however, F2($u$, $v$) is uniquely determined for the chart image c. Hence, F2($u$, $v$) may be calculated in advance. The evaluation value calculation unit 214 may acquire the value calculated in advance from a storage medium such as the HDD 205 (third acquisition unit).

From step S1303, the evaluation value calculation unit 214 extracts disturbing components. This processing means calculating the frequency component value difference between the captured video V and an ideal video without moving image degradation. In step S1303, the evaluation value calculation unit 214 calculates the signal strength value |F2($u$, $v$)| of F2($u$, $v$) obtained in step S1302.

In step S1304, the evaluation value calculation unit 214 calculates a spatial disturbing component $J_{spatial}$. The spatial disturbing component $J_{spatial}$ is the sum of power spectra on the plane where the temporal frequency is 0 and can be calculated by $$J_{spatial} = \sum_u \sum_v (|F1(u, v, 0)| - |F2(u, v)|)$$

In step S1305, the evaluation value calculation unit 214 calculates a temporal disturbing component $J_{temp}$. The temporal disturbing component $J_{temp}$ is the sum of power spectra on the space where the temporal frequency is not 0 and can be calculated by $$J_{temp} = \sum_u \sum_v \sum_{f \neq 0} |F1(u, v, f)|$$

In step S1306, the evaluation value calculation unit 214 calculates the linear sum of the spatial disturbing component $J_{spatial}$ and the temporal disturbing component $J_{temp}$. More specifically, the calculation can be done by $$S = \alpha \times J_{temp} + (1-\alpha) \times J_{spatial}$$

In this equation $\alpha$ can arbitrarily be determined. Normally, $0 \leq \alpha \leq 1$. To emphasize the temporal disturbing component, $\alpha$ having a larger value can be employed. To emphasize the spatial disturbing component, $\alpha$ having a smaller value can be employed. The value $\alpha$ may be stored in a storage medium such as the HDD 205 or input by the user via, for example, the keyboard 202 or the application window 301.

In step S1307, the evaluation value calculation unit 214 calculates the evaluation value in accordance with the linear sum S calculated in step S1306 and outputs it. For example, the evaluation value calculation unit 214 may directly output the linear sum S as the evaluation value. In this embodiment, to normalize the evaluation value, the evaluation value calculation unit 214 divides the linear sum S by the sum of power spectra of an ideal video obtained when the display 102 displays the captured video V without image degradation. The ideal video corresponds to a video whose frames are formed from the above-described comparative image.

Figure 2:
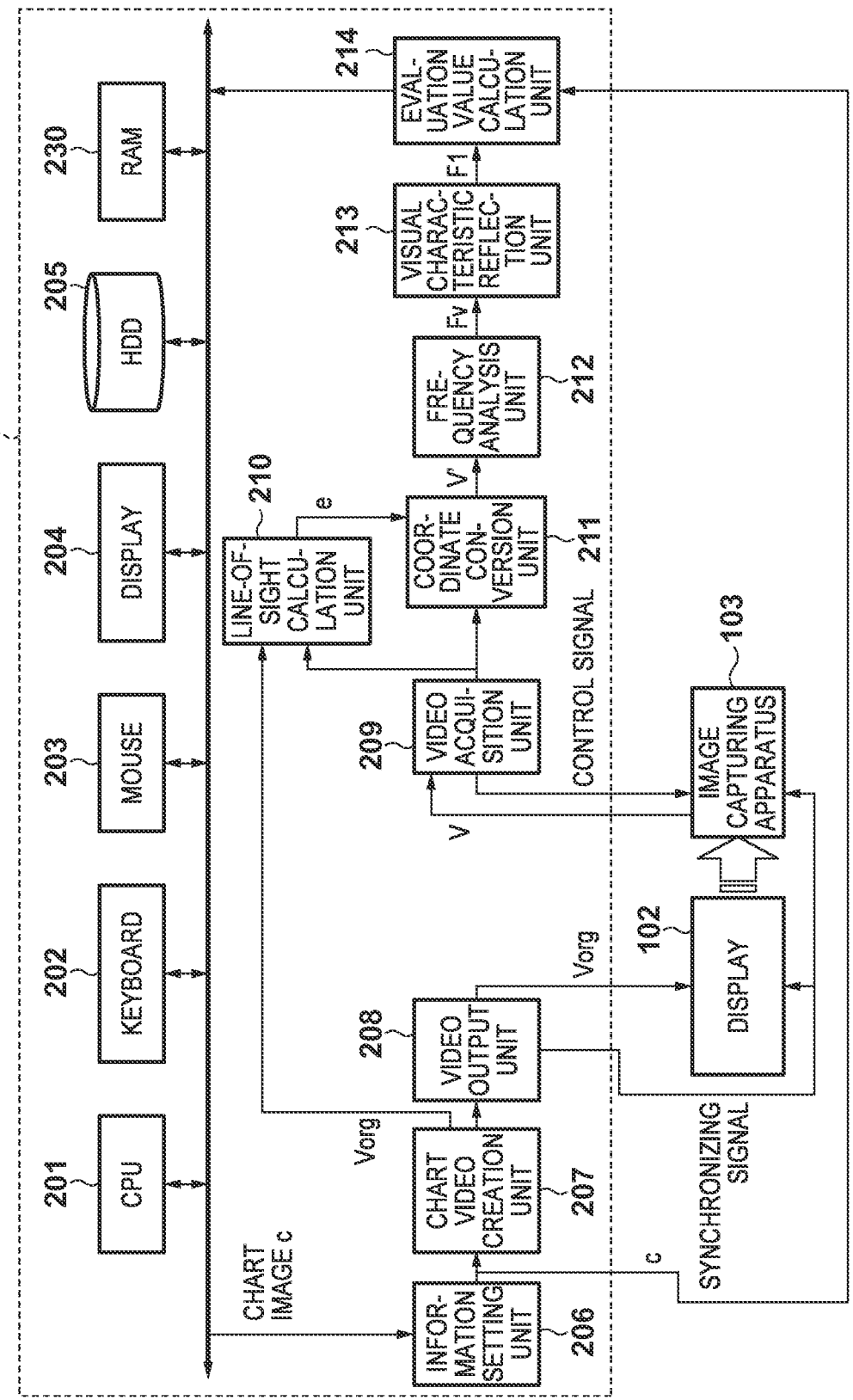
FIG. 2 is a block diagram showing an example of the arrangement of a video evaluation apparatus according to the first embodiment.

In this embodiment, the video evaluation apparatus 101 has the arrangement shown in FIG. 2. The units of the video evaluation apparatus according to this embodiment can be either formed from dedicated hardware or implemented by software. For example, the functions of the units 206 to 214 can be implemented by reading out programs recorded in a storage medium such as the HDD 205 to a memory such as the RAM 230 and causing the CPU 201 to operate in accordance with the programs. This also applies to the embodiments to be described later.

In this embodiment, the evaluation value calculation unit 214 extracts the disturbing components by calculating the frequency component value difference between the captured video V and the ideal video without moving image degradation. However, the disturbing component extraction method is not limited to this. For example, the evaluation value calculation unit 214 may subtract each pixel value of the comparative image from a corresponding pixel value of each frame image of the coordinate conversion result v' (subtraction unit). That is, the evaluation value calculation unit 214 may generate a difference video having, as frame images, the difference images between the comparative image and the frame images of the coordinate conversion result v'. The disturbing components can be extracted by performing frequency analysis processing, as described above, for the difference video after the subtraction processing and reflecting the visual characteristics as needed.

In this embodiment, the evaluation value is calculated based on the linear sum of the spatial disturbing component $J_{spatial}$ and the temporal disturbing component $J_{temp}$. However, to obtain an evaluation value for an image variation between frames, the evaluation value may be calculated based on only the temporal disturbing component $J_{temp}$. In this case, frequency analysis processing in the temporal direction suffices because the temporal disturbing component $J_{temp}$ can be calculated based on the temporal frequency components.

Modification of First Embodiment

In the first embodiment, the chart video Vorg created by the chart video creation unit 207 is displayed on the display 102. Then, the evaluation value is calculated for the captured video V obtained by causing the image capturing apparatus 103 to capture the displayed video. This allows to evaluate the quality of the displayed moving image. As another example, the quality of a created moving image can be evaluated by applying the arrangement of the first embodiment.

In this modification, the chart video creation unit 207 creates the chart video Vorg in which the chart image c moves, as in the first embodiment. At this time, the chart video creation unit 207 can perform image processing for the chart video Vorg. An example of the image processing is frame rate conversion processing. The video acquisition unit 209 acquires not the image captured by the image capturing apparatus 103 but the chart video Vorg created by the chart video creation unit 207 as the captured video V. As described above, in this modification, it is unnecessary to display the chart video Vorg on the display 102. The other processes are executed as in the first embodiment.

According to the modification, it is possible to calculate the evaluation value of the digital data itself of the created chart video Vorg. More specifically, it is possible to quantitatively measure the change in image quality caused by image processing such as frame rate conversion processing.

Second Embodiment

In the first embodiment, the chart image c in the chart video Vorg moves in the horizontal direction. In the second embodiment, a chart image c in a chart video Vorg moves at uniform arbitrary velocities in arbitrary directions including the vertical direction. In this embodiment, the moving direction of the chart image c in the chart video Vorg is not limited to the horizontal direction. The chart video Vorg may be created in advance. However, in this embodiment, an information setting unit 206 acquires a user designation indicating the vertical and horizontal moving speeds of the chart image c via a dialogue. A chart video creation unit 207 creates the chart video Vorg in accordance with the user designation. This arrangement enables to evaluate degradation of the smoothness of a motion in an arbitrary direction. The difference from the first embodiment will be described below.

<Information Setting Unit 206>

Figure 15:
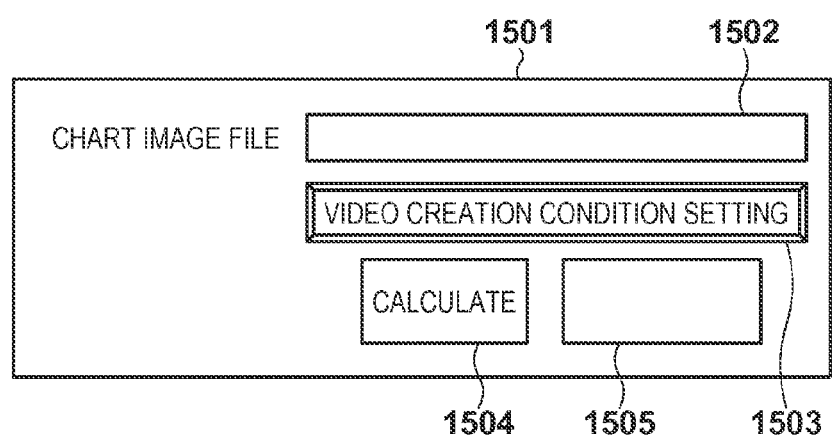
FIG. 15 is a schematic view showing a window to be used by an information setting unit according to the second embodiment.

The operation of the information setting unit 206 according to this embodiment will be described below. The information setting unit 206 acquires a user designation indicating a chart image file, as in the first embodiment. In this embodiment, the information setting unit 206 also acquires a user designation indicating the moving speed of the chart image c. More specifically, the information setting unit 206 first displays an application window 1501 on a display 204. FIG. 15 shows an example of the application window 1501 used in this embodiment. The user inputs the file path of the chart image c to a form 1502 of the application window 1501 using a keyboard 202, as in the first embodiment.

Figure 16:
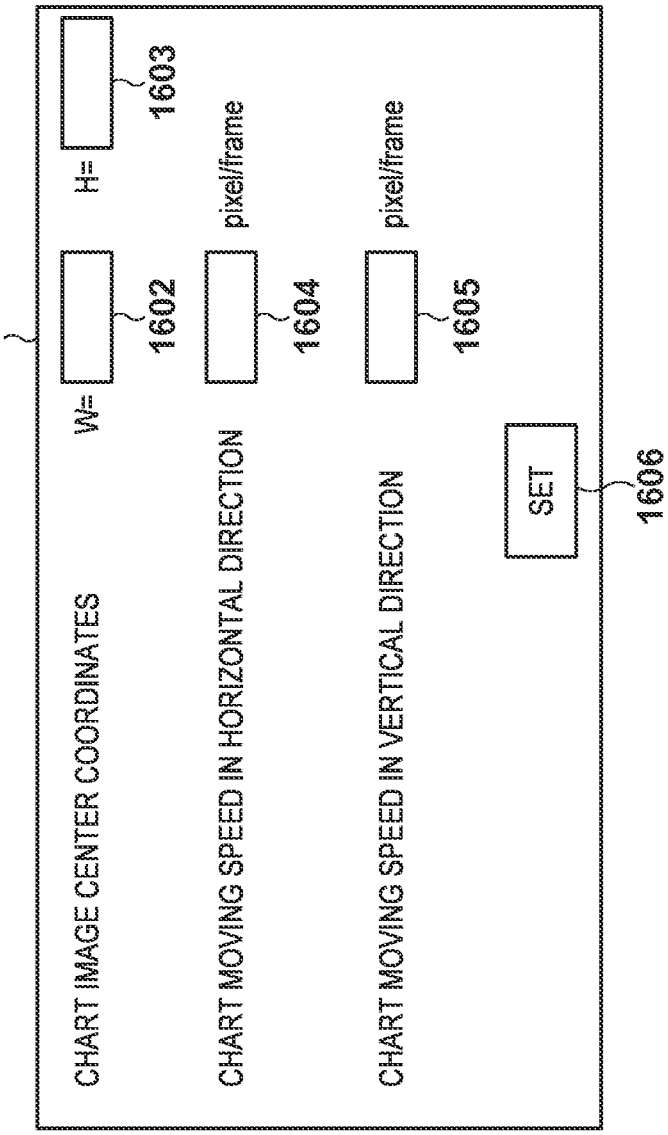
FIG. 16 is a schematic view showing a window to be used by the information setting unit according to the second embodiment.

Then the user clicks a button 1503 and a capture information setting dialogue 1601 is displayed on a display 102. FIG. 16 shows an example of the dialogue 1601. The user inputs the center coordinates of a chart 401 in the chart image c to a horizontal coordinate input form 1602 and a vertical coordinate input form 1603. The user also inputs the chart moving speed in the horizontal direction to a form 1604 and the chart moving speed in the vertical direction to a form 1605. The moving speed and moving direction of the chart are designated in this way. When the user finally clicks a button 1606, display of the dialogue 1601 ends, and the application window 1501 is displayed again. When the user clicks a mouse 203 on a button 1504, video capturing and evaluation value calculation are performed. The calculated evaluation value of the smoothness of the motion is displayed in a form 1505.

<Chart Video Creation Unit 207>

The operation of the chart video creation unit 207 according to this embodiment is the same as in the first embodiment except the following point. That is, shift operation processing of step S503 is performed not only in the horizontal direction but also in the vertical direction. Letting vx be the horizontal moving speed designated in the form 1604 and vy be the vertical moving speed designated in the form 1605, shift amounts shiftx(n) and shifty(n) in the vertical and horizontal directions are given by $$shiftx(n) = vx \cdot n$$

$$shifty(n) = vy \cdot n$$

<Line-of-Sight Calculation Unit 210>

The operation of a line-of-sight calculation unit 210 according to this embodiment is the same as in the first embodiment except the following point. That is, the line-of-sight calculation unit 210 calculates line-of-sight information, using the chart moving speeds input to the forms 1604 and 1605, by $$ex(t) = Cx + vx \cdot t$$

$$ey(t) = Cy + vy \cdot t$$

where (ex(t), ey(t)) represents the line-of-sight center coordinates at a frame number t. Let vx be the chart moving speed in the horizontal direction, vy be the chart moving speed in the vertical direction, and (Cx, Cy) be the center coordinates of the chart 401 in the chart image c. The line-of-sight calculation unit 210 transfers line-of-sight information e obtained by the above-described equations to a coordinate conversion unit 211.

As in the first embodiment, the chart moving speeds vx and vy can be the same values as those used in the chart video creation processing. The line-of-sight calculation unit 210 may calculate the moving speeds vx and vy from the chart image c and a captured video V.

Third Embodiment

In the first embodiment, the data of the chart image c including the chart 401 is used to calculate the frequency analysis result Fref(u, v, f) when the display 102 displays the captured video V without image degradation. In the third embodiment, not the data of a chart image c but a still image obtained by causing an image capturing apparatus 103 to capture the chart image c displayed on a display 102 is used to calculate a frequency analysis result Fref(u, v, f). According to the arrangement of this embodiment, the influence of the image capturing characteristics of the image capturing apparatus 103 can be reduced when extracting disturbing components. It is therefore possible to more accurately evaluate the quality of moving image display. The difference from the first embodiment will be described below.

<Arrangement of Video Evaluation Apparatus 101>

Figure 17:
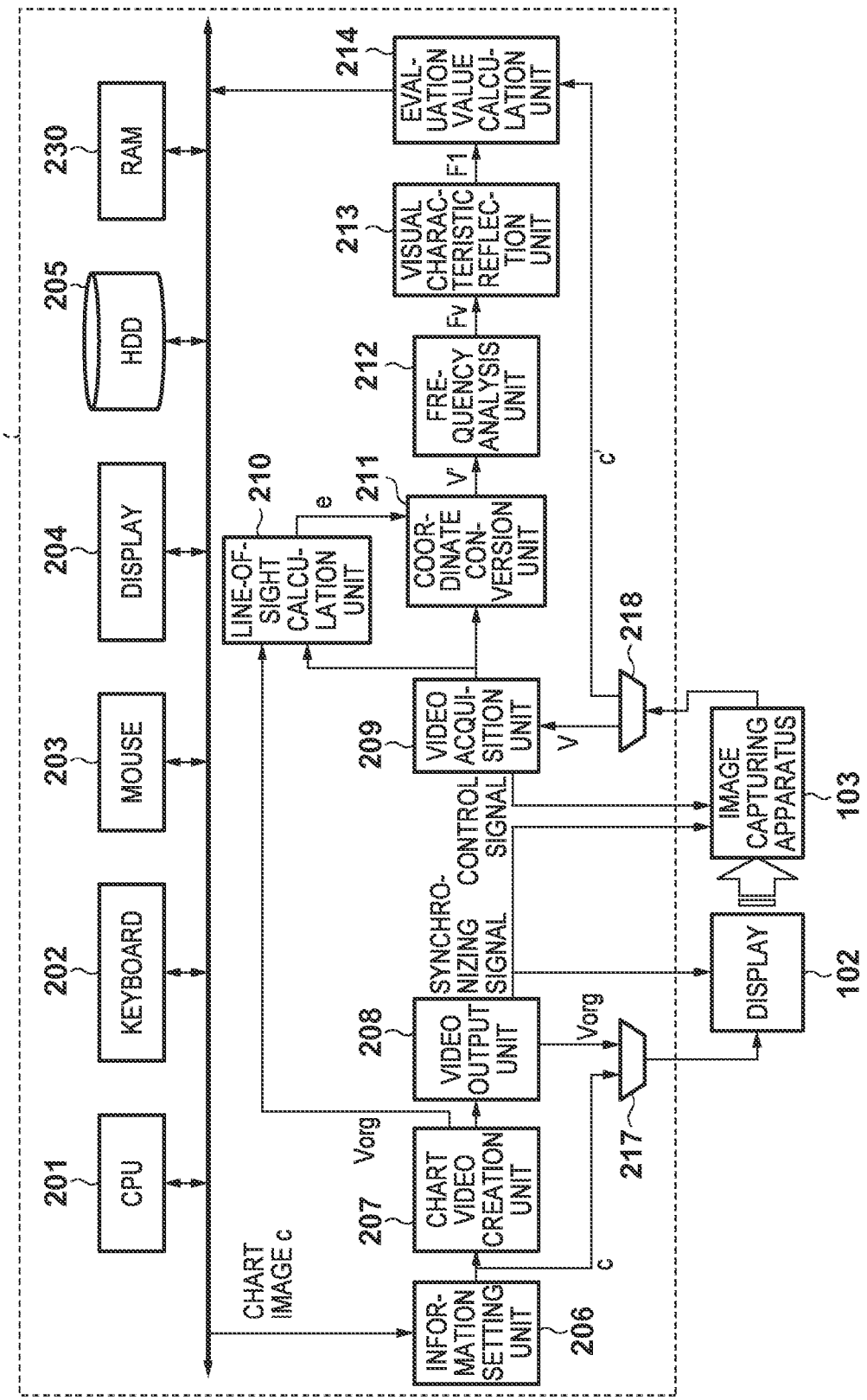
FIG. 17 is a block diagram showing an example of the arrangement of a video evaluation apparatus according to the third embodiment.

FIG. 17 illustrates the arrangement of a video evaluation apparatus 101 according to this embodiment. The display 102 displays a chart video Vorg created using the chart image c, as in the first embodiment. The image capturing apparatus 103 captures the chart video Vorg displayed on the display 102 and records it as a captured video V. In this embodiment, the display 102 also displays the chart image c. The image capturing apparatus 103 captures the chart image c displayed on the display 102 and records it as a captured chart image c'. An evaluation value calculation unit 214 calculates an evaluation value using F1 calculated by a visual characteristic reflection unit 213 and the captured chart image c'.

<Video Output Unit 208 and Video Acquisition Unit 209>

The operation of a video output unit 208 according to this embodiment is the same as in the first embodiment except the following point. That is, the video output unit 208 outputs the chart video Vorg to a multiplexer 217. In addition, an information setting unit 206 outputs the chart image c to the multiplexer 217.

The video output unit 208 also sends a selection signal to the multiplexer 217 to cause it to select one of the chart image c and the chart video Vorg. The selected chart image c or chart video Vorg is transferred to the display 102 and captured by the image capturing apparatus 103.

Capturing of the chart video Vorg will be explained first. Capturing of the chart video Vorg is done as in the first embodiment. First, the multiplexer 217 selects the chart video Vorg and outputs it to the display 102. The video output unit 208 sends control signals concerning the start and end of image capturing to the image capturing apparatus 103. The image capturing apparatus 103 thus captures the chart video Vorg displayed on the display 102. The video V captured by the image capturing apparatus 103 is transferred to a demultiplexer 218.

Capturing of the chart image c will be explained next. First, the multiplexer 217 selects the chart image c and outputs it to the display 102. The video output unit 208 sends control signals concerning the start and end of image capturing to the image capturing apparatus 103. The image capturing apparatus 103 thus captures the chart image c displayed on the display 102. The shutter speed when capturing the chart image c is set to the same value as the shutter speed when capturing each frame of the chart video Vorg. The number of captured frames is 1. The image captured by the image capturing apparatus 103 is transferred to the demultiplexer 218 as the captured chart image c'. The demultiplexer 218 outputs the captured chart image c' received from the image capturing apparatus 103 to the evaluation value calculation unit 214. The evaluation value calculation unit 214 uses the captured chart image c' to calculate the evaluation value in place of the chart image c. That is, an evaluation image including the captured chart image c' is created, and Fourier transformation is performed for the evaluation image.

Fourth Embodiment

There is known a display that displays an input video at a higher frame rate. For example, a double-speed driving scheme is known, which forms, for a video including a plurality of frames, interpolation frames for interpolating the frames and inserts them between the frames, thereby increasing the frame rate of the video. In the fourth embodiment, the frame rate of image capturing by an image capturing apparatus 103 is set to be higher than the driving frequency of a display 102, thereby evaluating the display quality of the display. According to this embodiment, it is also possible to evaluate, for example, the motion smoothness difference between a PDP that performs an operation closer to plane sequential display and an LCD that performs an operation closer to line sequential display. The difference from the first embodiment will be described below.

<Information Setting Unit 206>

Figure 18:
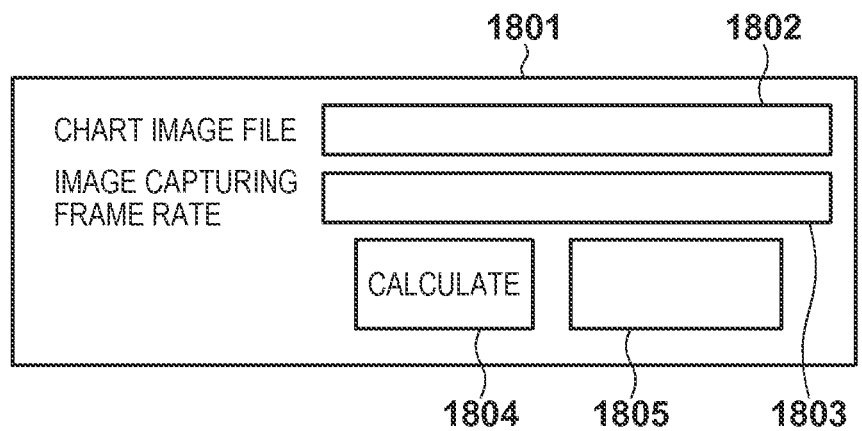
FIG. 18 is a schematic view showing a window to be used by an information setting unit according to the fourth embodiment.

In this embodiment, an information setting unit 206 acquires not only information to designate a chart image c, as in the first embodiment, but also information to designate the image capturing frame rate. First, the information setting unit 206 displays an application window 1801 shown in FIG. 18 on a display 204. The user inputs the file path of the chart image c stored in an HDD 205 to a form 1802 of the application window 1801, as in the first embodiment.

In addition, the user inputs the image capturing frame rate of the image capturing apparatus 103 to a form 1803. In the first embodiment, the frame rate of the image capturing apparatus 103 is controlled based on the frame rate of the chart video Vorg. In the fourth embodiment, double-speed driving processing can be performed by an image processing circuit in the display 102. In this case, the frame rate of a chart video Vorg may mismatch the driving frequency of the display 102. Hence, in this embodiment, the user designates the frame rate of the image capturing apparatus 103. The image capturing frame rate may be the same as the driving frequency of the display 102. In addition, oversampling may be performed by setting the image capturing frame rate to an integer multiple of the driving frequency of the display 102.

When the user clicks a mouse 203 on a button 1804 after inputting these pieces of information, video capturing and evaluation processing are executed. The calculated evaluation value is displayed in a form 1805.

<Video Acquisition Unit 209>

A video acquisition unit 209 sends image capturing start and end signals to the image capturing apparatus 103. In this embodiment, shutter open/close in the image capturing apparatus 103 is controlled not by the vertical synchronizing signal input from the video acquisition unit 209 but by an internal synchronizing signal generated in the image capturing apparatus 103, unlike the first embodiment. The frequency of the internal synchronizing signal generated in the image capturing apparatus 103 is controlled by the information setting unit 206. The frequency of the internal synchronizing signal is the frequency designated by the user via the form 1803 shown in FIG. 18. The image capturing apparatus 103 thus captures, at the frame rate designated by the user, the chart video Vorg displayed on the display 102. A video V thus captured by the image capturing apparatus 103 is input to the video acquisition unit 209.

<Line-of-Sight Calculation Unit 210>

In this embodiment, a line-of-sight calculation unit 210 calculates line-of-sight information in consideration of the image capturing frame rate of the image capturing apparatus 103. More specifically, the line-of-sight calculation unit 210 calculates line-of-sight center coordinates $(ex(t), ey(t))$ at a frame number t by $$ex(t) = Cx + (Forg/Fv) \cdot vx \cdot t$$

$$ey(t) = Cy$$

where Forg is the frame rate of the evaluation target video Vorg, Fv be the image capturing frame rate of the image capturing apparatus 103, vx be the chart moving speed in the horizontal direction, and (Cx, Cy) be the center coordinates of a chart 401 in the chart image c.

Fifth Embodiment

In the above-described embodiments, the quality of a displayed moving image is evaluated for a chart video including a chart image. In the fifth embodiment, the quality of a displayed moving image is evaluated for an arbitrary video such as a live-action moving image. In this embodiment, an eye tracker is used to acquire the line-of-sight center coordinates of the observer. The eye tracker can acquire complex line-of-sight information when the observer views a live-action moving image. The difference from the first embodiment will be described below.

Figure 19:
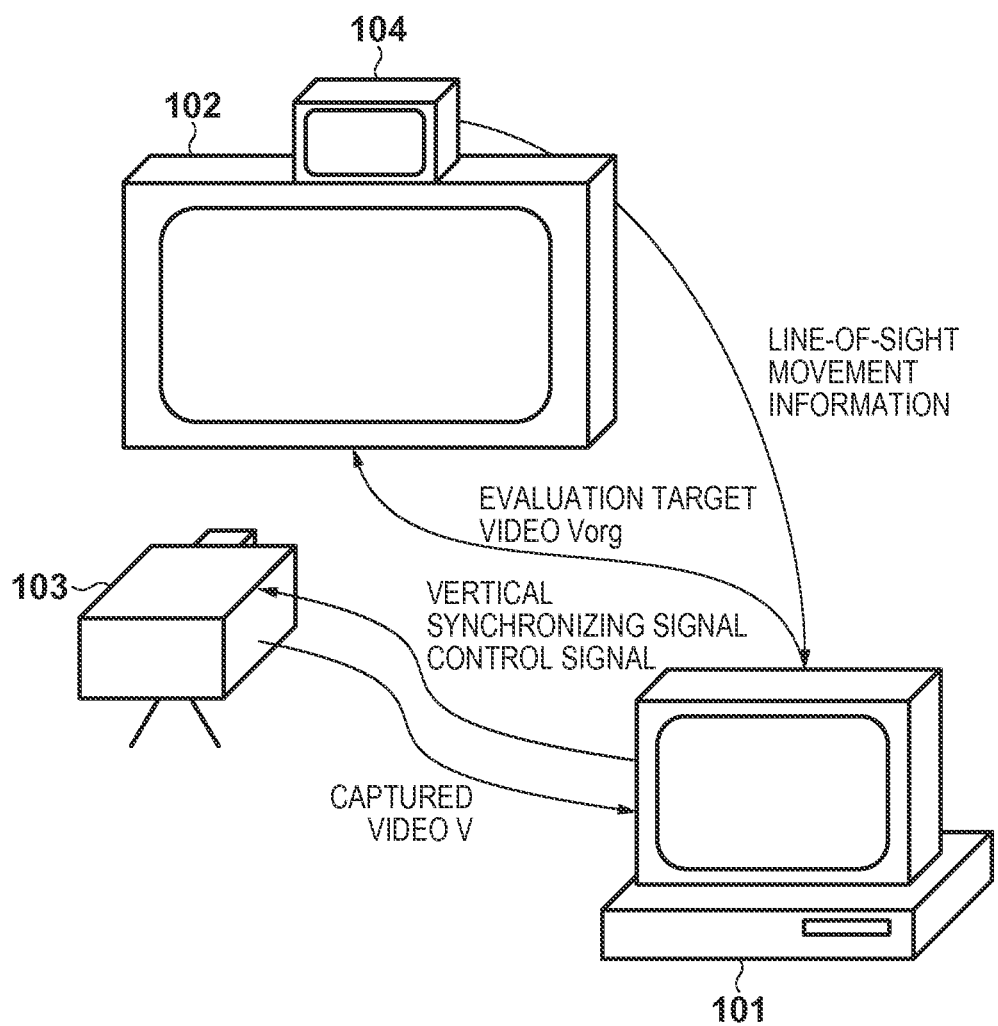
FIG. 19 is a view showing an example of the arrangement of a video evaluation system according to the fifth embodiment.

Processing according to this embodiment will be explained with reference to FIG. 19. A display 102, an image capturing apparatus 103, and an eye tracker 104 are connected to a video evaluation apparatus 101. The video evaluation apparatus 101 outputs an evaluation target video Vorg designated by the user to the display 102. The image capturing apparatus 103 captures the evaluation target video Vorg displayed on the display 102. The captured video is input to the video evaluation apparatus 101 as a captured video V. The eye tracker 104 acquires the line-of-sight information of the user when viewing the evaluation target video Vorg displayed on the display 102. The video evaluation apparatus 101 calculates an evaluation value based on the captured video V and the line-of-sight information.

<Arrangement of Video Evaluation Apparatus 101>

Figure 20:
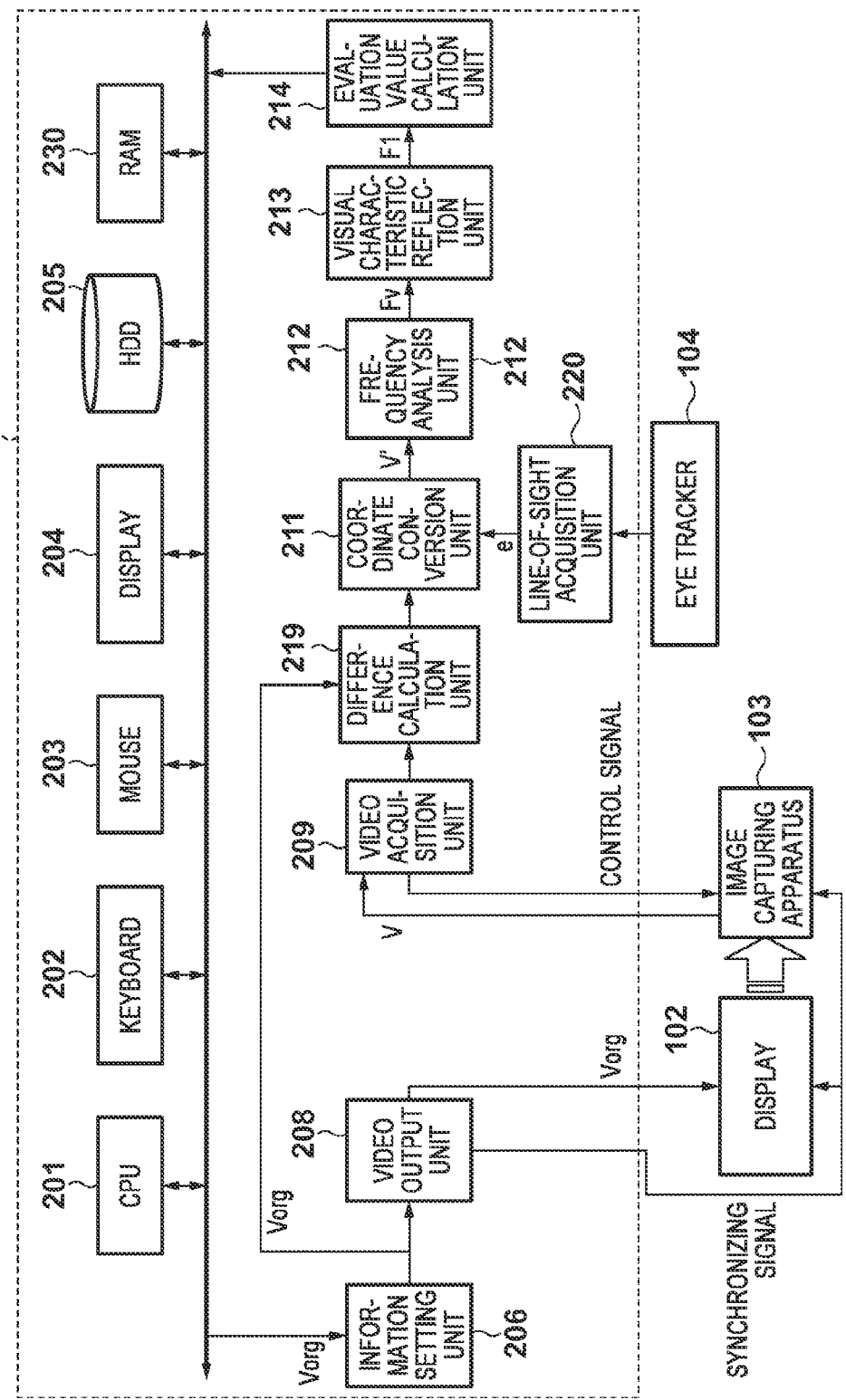
FIG. 20 is a block diagram showing an example of the arrangement of a video evaluation apparatus according to the fifth embodiment.

FIG. 20 illustrates the arrangement of the video evaluation apparatus 101 according to this embodiment. Processing according to this embodiment will be described below with reference to the flowchart of FIG. 31B. In step S3210, an information setting unit 206 acquires the evaluation target video Vorg, as will be described later (third acquisition unit). In step S3220, a video output unit 208 outputs the evaluation target video Vorg to the display 102. In this embodiment, the evaluation target video Vorg is stored in a storage medium such as an HDD 205. The video evaluation apparatus 101 of this embodiment need not include a chart video creation unit 207 because the chart video Vorg need not be generated from a chart image c, unlike the first embodiment. The image capturing apparatus 103 captures the evaluation target video Vorg displayed on the display 102, as in the first embodiment. The video acquisition unit 209 acquires the video captured by the image capturing apparatus 103 as the captured video V (first acquisition unit).

In step S3230, a line-of-sight acquisition unit 220 acquires line-of-sight information from the eye tracker 104 (second acquisition unit). In step S3240, a difference calculation unit 219 calculates the difference between the evaluation target video Vorg and the captured video V as a disturbing video Vsub (difference moving image), as will be described later (generation unit). In step S3250, a coordinate conversion unit 211 cuts out a portion corresponding to the visual field of the observer for each frame of the disturbing video Vsub in accordance with the line-of-sight information, thereby generating a coordinate conversion result V' (cut-out unit). The processing of the coordinate conversion unit 211 can be done as in the first embodiment. The line-of-sight information used by the coordinate conversion unit 211 in this embodiment is the information the line-of-sight acquisition unit 220 has acquired from the eye tracker 104. That is, the coordinate conversion unit 211 cuts out the pixel group in a predetermined range around the pixel to which the line of sight of the observer represented by the line-of-sight information is directed. The coordinate conversion unit 211 generates the coordinate conversion result V' having the cutout pixel group as a frame image.

In step S3260, a frequency analysis unit 212 performs frequency analysis processing for the coordinate conversion result V', thereby calculating a frequency analysis result Fv, as in the first embodiment (conversion unit). In step S3270, a visual characteristic reflection unit 213 reflects the visual characteristics on the frequency analysis result, thereby calculating a frequency analysis result F1, as in the first embodiment. In step S3280, an evaluation value calculation unit 214 calculates an evaluation value based on the frequency analysis result F1, as will be described later (calculation unit). Processing to be performed by the information setting unit 206, the line-of-sight acquisition unit 220, the difference calculation unit 219, and the evaluation value calculation unit 214 will be described below in detail.

<Information Setting Unit 206>

Figure 21:
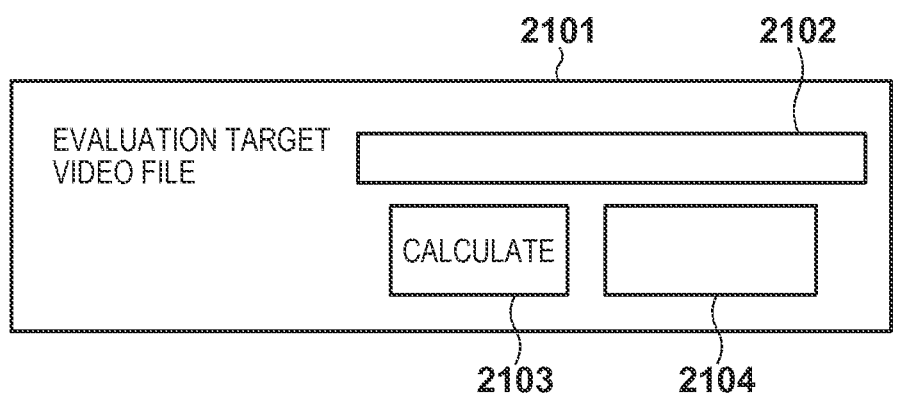
FIG. 21 is a schematic view showing a window to be used by an information setting unit according to the fifth embodiment.

The operation of the information setting unit 206 will be described first in detail. First, the information setting unit 206 acquires a user input to designate the evaluation target video Vorg. FIG. 21 shows an example of an application window 2101 to be used by the information setting unit 206 to acquire the user input.

The user inputs the file path of the evaluation target video Vorg stored in the HDD 205 to a form 2102 of the application window 2101. After that, when the user clicks a mouse 203 on a button 2103, video capturing and evaluation processing are executed. The calculated evaluation value is displayed in a form 2104.

<Difference Calculation Unit 219>

Processing to be performed by the difference calculation unit 219 will be described next with reference to the flowchart of FIG. 22. In step S2201, the difference calculation unit 219 loads the evaluation target video Vorg. In step S2202, the difference calculation unit 219 loads the captured video V acquired by the video acquisition unit 209. In step S2203, the difference calculation unit 219 initializes the process frame number. For example, the difference calculation unit 219 sets 0 to the process frame number.

In step S2204, the difference calculation unit 219 calculates the difference between the captured video V and the evaluation target video Vorg for the frame designated by the process frame number. More specifically, when the process frame number is represented by n, the difference between the nth frame of the captured video V and the nth frame of the evaluation target video Vorg is calculated. The difference calculation unit 219 stores the obtained difference as the nth frame of the disturbing video Vsub.

In step S2205, the difference calculation unit 219 updates the process frame number. More specifically, the difference calculation unit 219 adds 1 to the process frame number. In step S2206, the difference calculation unit 219 determines whether the process frame number has exceeded the final frame number of the evaluation target video Vorg. If the process frame number has exceeded the final frame number, the processing ends. If the process frame number has not exceeded the final frame number, the process returns to step S2204. With the above-described processing, the difference calculation unit 219 generates the disturbing video Vsub.

<Line-of-Sight Acquisition Unit 220>

The operation of the line-of-sight acquisition unit 220 will be described next. In this embodiment, the line-of-sight information is measured using the eye tracker 104. More specifically, the line-of-sight acquisition unit 220 sends a control signal to instruct the start of measurement to the eye tracker 104 in synchronism with the output of the evaluation target video Vorg from the video output unit 208 to the display 102. When the user facing the display 102 looks at the display 102, the eye tracker 104 acquires the point of the display 102 the user is looking at.

The eye tracker 104 can acquire, for each frame of the evaluation target video Vorg, the line of sight of the user when the frame is displayed. That is, the eye tracker 104 can acquire the line-of-sight center coordinates for each frame image. When display of the evaluation target video Vorg has ended, the line-of-sight acquisition unit 220 sends a measurement end signal to the eye tracker 104. The line-of-sight acquisition unit 220 inputs line-of-sight information e measured by the eye tracker 104 to the coordinate conversion unit 211.

In this embodiment, every time the evaluation target video Vorg is displayed on the display 102, the eye tracker 104 measures the line-of-sight information. However, the line of sight of the user may similarly move even when the evaluation target video Vorg is displayed on each of a plurality of different displays. Hence, the line-of-sight information of the user when viewing the evaluation target video Vorg may be measured in advance and recorded in a storage medium such as the HDD 205 in association with the evaluation target video Vorg. In this case, the line-of-sight acquisition unit 220 reads out the recorded line-of-sight information from the storage medium.

<Evaluation Value Calculation Unit 214>

The operation of the evaluation value calculation unit 214 will be described next with reference to the flowchart of FIG. 23. In step S2301, the evaluation value calculation unit 214 calculates the signal strength value $|F1(u, v, f)|$ of the frequency analysis result $F1(u, v, f)$ calculated by the visual characteristic reflection unit 213, as in the first embodiment. In step S2302, the evaluation value calculation unit 214 calculates a spatial disturbing component $J_{spatial}$. More specifically, the evaluation value calculation unit 214 can calculate the sum of power spectra on the plane where the temporal frequency is 0 as the spatial disturbing component $J_{spatial}$. That is, the spatial disturbing component $J_{spatial}$ can be calculated by $$J_{spatial} = \sum_u \sum_v (|F1(u, v, 0)|)$$

In step S2303, the evaluation value calculation unit 214 calculates a temporal disturbing component $J_{temp}$. More specifically, the evaluation value calculation unit 214 can calculate the sum of power spectra on the space where the temporal frequency is not 0 as the temporal disturbing component $J_{temp}$. That is, the temporal disturbing component $J_{temp}$ can be calculated by $$J_{temp} = \sum_u \sum_v \sum_{f \neq 0} |F1(u, v, f)|$$

In step S2304, the evaluation value calculation unit 214 calculates the linear sum of the spatial disturbing component and the temporal disturbing component, as in step S1306 of the first embodiment. More specifically, the calculation can be done by $$S = \alpha \times J_{temp} + (1-\alpha) \times J_{spatial}$$

In this equation α can be determined as in the first embodiment.

In step S2305, the evaluation value calculation unit 214 calculates the evaluation value in accordance with the linear sum S calculated in step S2304 and outputs it, as in step S1307 of the first embodiment.

In this embodiment as well, not the display quality of a moving image but the quality of the moving image itself can be measured, as in the modification of the first embodiment. For example, the line-of-sight information of the user when viewing the evaluation target video Vorg is acquired in advance. The video acquisition unit 209 acquires a video obtained by performing image processing for the evaluation target video Vorg in place of the captured video V. By performing the remaining processes as described above, the quality of the video obtained by performing image processing for the evaluation target video Vorg can be measured. More specifically, it is possible to measure the change in moving image quality caused by image processing.

Sixth Embodiment

In the sixth embodiment, an evaluation value is calculated in a calculation amount smaller than in the first embodiment by placing focus on a horizontal motion in a captured video V. More specifically, the processing amount of a coordinate conversion unit 211 and the calculation amount of an evaluation value calculation unit 214 are decreased. This allows to shorten the evaluation value calculation time. The difference from the first embodiment will be described below.

<Coordinate Conversion Unit 211>

Processing to be performed by the coordinate conversion unit 211 will be described with reference to the flowchart of FIG. 24. In step S2401, the coordinate conversion unit 211 extracts a horizontal-temporal image f(x, t) from the captured video V. In this embodiment, the coordinate conversion unit 211 cuts out the pixel group of one horizontal line from each frame image of the captured video V, thereby generating the horizontal-temporal image f(x, t). In this embodiment, the coordinate conversion unit 211 cuts out the pixels of one line at the center of each frame image. However, the present invention is not limited to this. In this embodiment, since image movement in the vertical direction is not evaluated, a chart 401 may be an image having a uniform pixel value in the vertical direction.

In this embodiment, the chart 401 in a chart video Vorg moves in the horizontal direction, as in the first embodiment. In this case, the evaluation value calculated for the pixel group of one horizontal line extracted from the captured video V, as in this embodiment, supposedly reflects the smoothness of the motion of the moving image well.

FIGS. 26A and 26B show an example of the horizontal-temporal image extracted in step S2401. A pixel array in the horizontal direction is extracted from each frame image shown in FIG. 26A, thereby generating a horizontal-temporal image shown in FIG. 26B. In the horizontal-temporal image shown in FIG. 26B, the lateral direction corresponds to the horizontal direction (x-axis) of each frame image, and the longitudinal direction corresponds to the frame number.

The processing of step S2401 will be described below in detail with reference to the flowchart of FIG. 25. In step S2501, the coordinate conversion unit 211 acquires the start frame of the captured video V as the process frame. The coordinate conversion unit 211 also sets the process frame number to the start frame number of the captured video V.

In step S2502, the coordinate conversion unit 211 converts the pixel value of each pixel of the process frame into a luminance value. The coordinate conversion unit 211 can do this conversion by looking up a lookup table, as in the first embodiment. In step S2503, the coordinate conversion unit 211 cuts out one horizontal line at the center of the process frame and stores it as part of a horizontal-temporal image. The thus obtained horizontal-temporal image f(x, t) is represented by $$f(x,t) = v(x, h/2, t)$$

For the frame image of a frame number t, the pixel value of a pixel having a horizontal coordinate x and a vertical coordinate y is represented by v(x, y, t). The number of pixels of the frame image in the vertical direction is represented by h. Steps S2501 and S2502 may actually be performed in a reverse order.

In step S2504, the coordinate conversion unit 211 updates the process frame and the process frame number. More specifically, the coordinate conversion unit 211 adds 1 to the process frame number and acquires the frame image indicated by the process frame number as the process frame. In step S2505, the coordinate conversion unit 211 determines whether the process frame number has exceeded the final frame number. If the process frame number has exceeded the final frame number, the processing of step S2401 ends. If the process frame number has not exceeded the final frame number, the process returns to step S2502.

Figure 27:
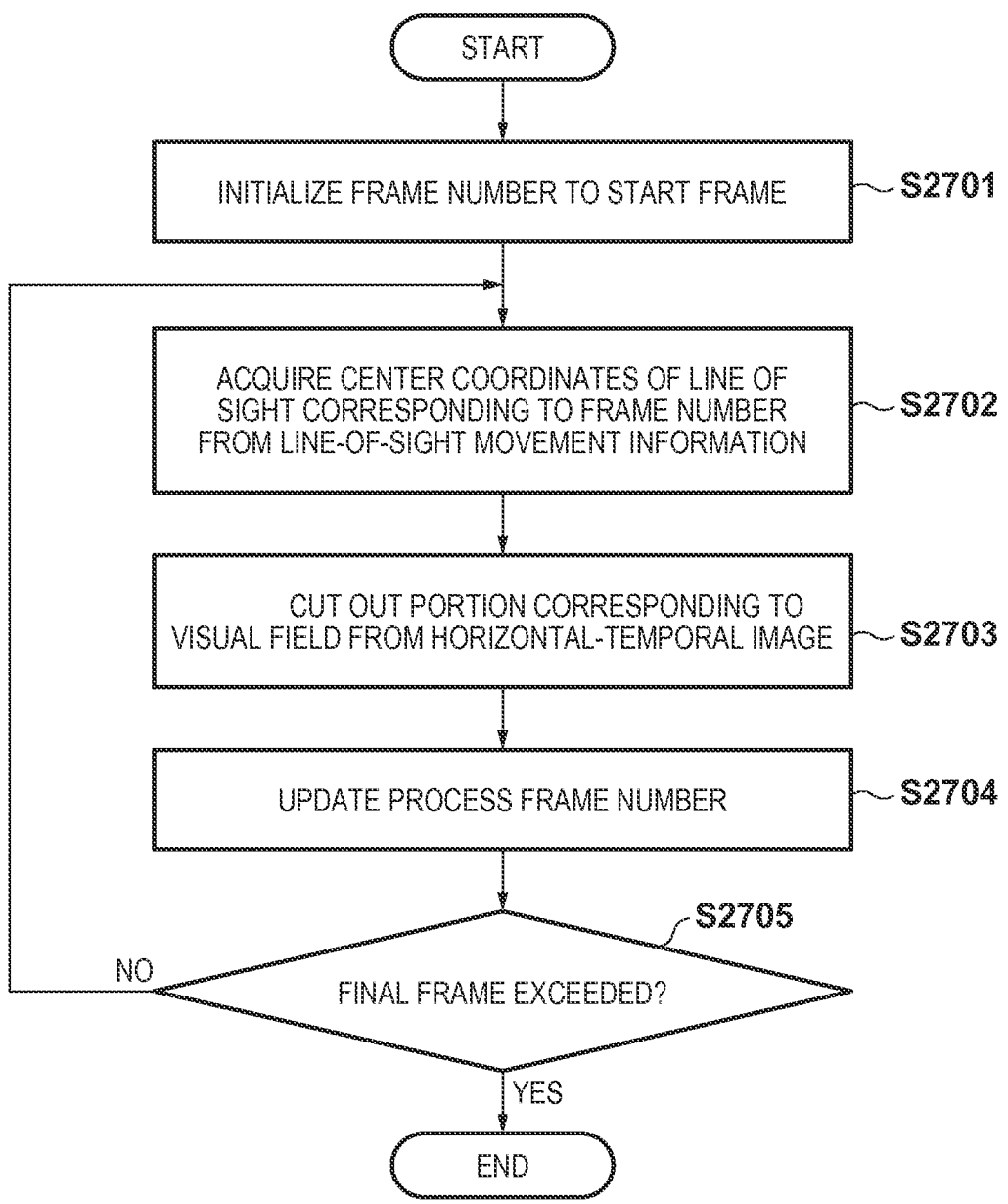
FIG. 27 is a flowchart showing the operation of the coordinate conversion unit according to the sixth embodiment.

The processing of step S2402 will be described next with reference to the flowchart of FIG. 27. In step S2701, the coordinate conversion unit 211 sets the process frame number to the start frame number of the captured video V. In step S2702, the coordinate conversion unit 211 acquires the x-coordinate ex(t) of the line-of-sight center corresponding to the process frame number t. In step S2703, the coordinate conversion unit 211 cuts out a portion corresponding to the visual field for the frame number t. More specifically, the coordinate conversion unit 211 can extract a coordinate conversion result V'(x, t) from the horizontal-temporal image f(x, t) by $$f(x,t)=V'(x-ex(t),t)$$

The range of x is represented by $$ex(t)-dx \leq x \leq ex(t)+dx$$

In step S2704, the coordinate conversion unit 211 updates the process frame number. More specifically, the coordinate conversion unit 211 adds 1 to the process frame number. In step S2705, the coordinate conversion unit 211 determines whether the process frame number has exceeded the final frame number. If the process frame number has exceeded the final frame number, the processing of step S2402 ends. If the process frame number has not exceeded the final frame number, the process returns to step S2702.

Figure 28:
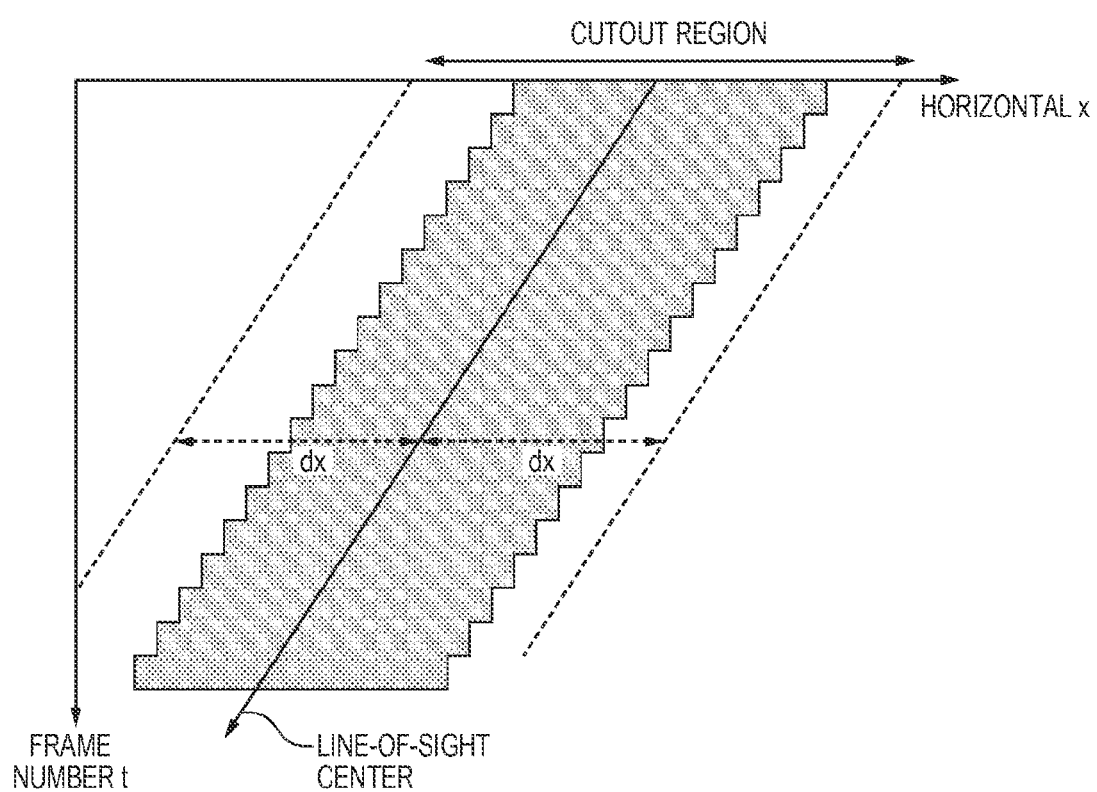
FIG. 28 is a schematic view for explaining processing of cutting out a portion corresponding to a visual field from the horizontal-temporal image.
Figure 29:
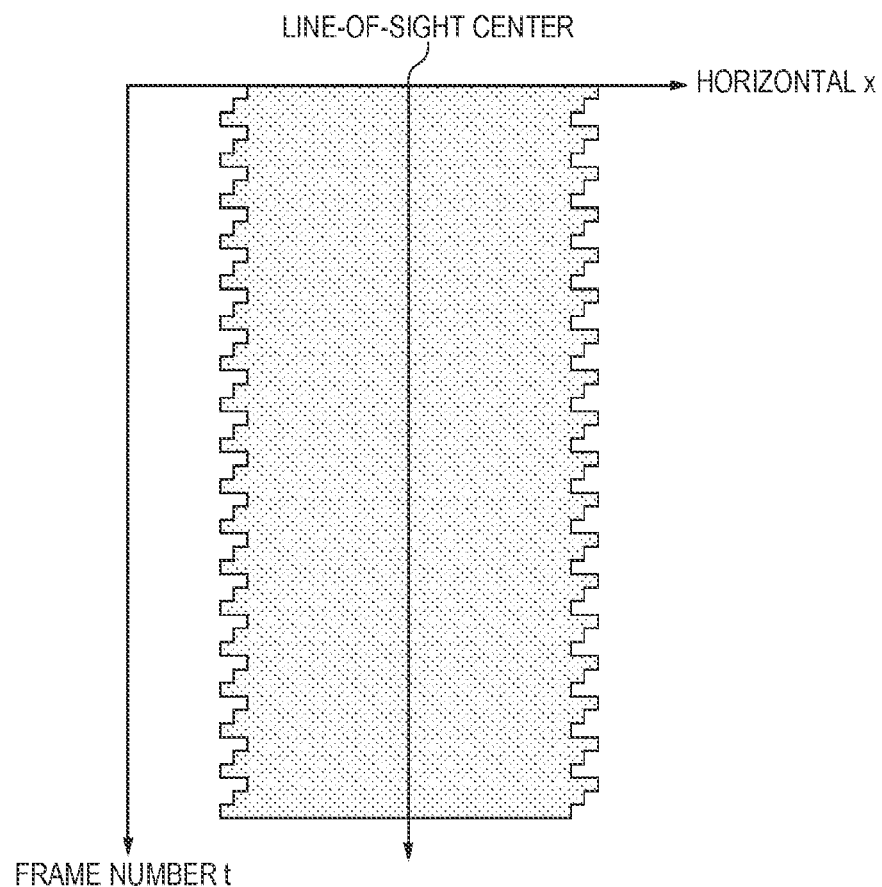
FIG. 29 is a schematic view of a coordinate-converted image cut out from the horizontal-temporal image.

With the above-described processing, the coordinate conversion result V'(x, t) representing the video formed on the retina of the human and its time-rate change is obtained. FIG. 28 shows an example of the horizontal-temporal image obtained in step S2401. The region cut out in step S2703 is illustrated in FIG. 28. FIG. 29 shows an example of the coordinate conversion result V'(x, t) obtained by performing the processing of step S2402 for the horizontal-temporal image shown in FIG. 28. In FIG. 28, a pixel corresponding to the center coordinates of the line of sight moves in the horizontal direction as the time elapses. In FIG. 29, the horizontal position of the pixel corresponding to the center coordinates of the line of sight is fixed.

<Frequency Analysis Unit 212, Visual Characteristic Reflection Unit 213, and Evaluation Value Calculation Unit 214>

In this embodiment, a frequency analysis unit 212 performs two-dimensional frequency analysis processing for the coordinate conversion result V'(x, t), thereby obtaining a frequency analysis result Fv(u, f). For example, the frequency analysis unit 212 may perform two-dimensional Fourier transformation. A visual characteristic reflection unit 213 reflects a visual characteristic Vtf(u, f) on the frequency analysis result Fv(u, f), thereby calculating a frequency analysis result F1(u, f), as in the first embodiment. The visual characteristic Vtf(u, f) used at this time can be calculated by $$Vtf(u,f)=T(f) \cdot S(u)$$

where T is the function representing the visibility characteristic to the temporal frequency [Hz], and S is the function representing the visibility characteristic to the spatial frequency [cycles/degree].

The evaluation value calculation unit 214 calculates a spatial disturbing component $J_{spatial}$ and a temporal disturbing component $J_{temp}$ from the frequency analysis result F1(u, f) and obtains the linear sum of them, as in the first embodiment. In this embodiment, the spatial disturbing component $J_{spatial}$ and the temporal disturbing component $J_{temp}$ can be obtained by $$J_{spatial} = \sum_{u} (|F1(u, 0)| - |F2(u, 0)|)$$

$$J_{temp} = \sum_{u} \sum_{f \neq 0} |F1(u, f)|$$

The evaluation value calculation unit 214 can calculate a frequency analysis result F2(u) when no image degradation exists, as in the first embodiment and the coordinate conversion unit 211. Normally, a pixel array in the horizontal direction is extracted from a chart image c, and the frequency analysis result F2(u) is calculated using the extracted pixel array. In this case, the evaluation value calculation unit 214 can extract the pixel array such that the pixel array extracted from the chart image c corresponds to the pixel array cut out in step S2503.

In the first embodiment, the evaluation value is calculated using the coordinate conversion result V'(x, y, t) that is a three-dimensional image. In the sixth embodiment, however, the evaluation value is calculated using the coordinate conversion result V'(x, t) that is a two-dimensional image. For this reason, according to this embodiment, the calculation amount can be decreased.

Seventh Embodiment

Figure 30:
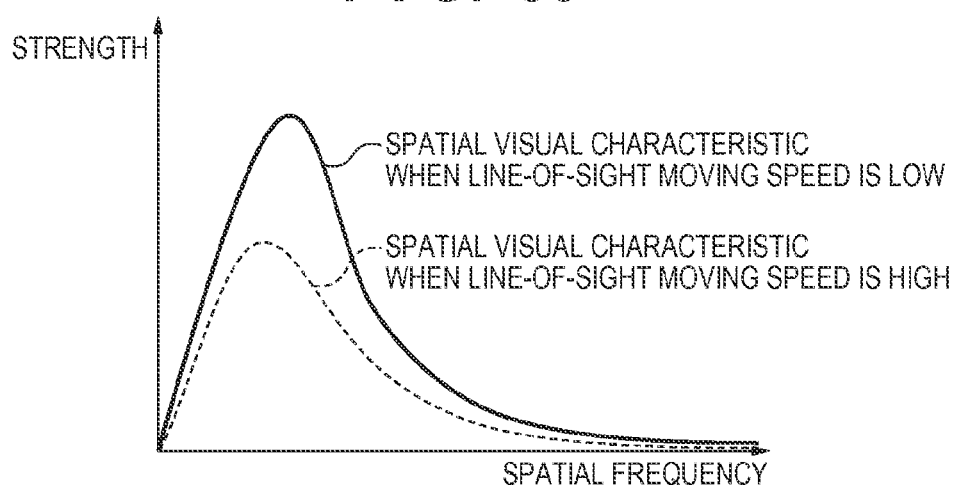
FIG. 30 is a schematic view for explaining changing the spatial visual characteristics in accordance with the line-of-sight moving speed.

In the above-described embodiments, the visual characteristics are always constant. However, the spatial frequency sensitivity of vision is known to lower as the moving speed of the line of sight increases. When this is taken into consideration, the evaluation accuracy is expected to be further improved. More specifically, the spatial visual characteristic is changed in accordance with the moving speed of the line of sight, as shown in FIG. 30. More specifically, the value of a visual characteristic Vtf to multiply a frequency analysis result Fv is made smaller as the moving speed of the line of sight increases, or the chart moving speed increases. In the above-described embodiments, the temporal/spatial frequency characteristics are obtained by simply adding the spatial frequency characteristic function and the temporal frequency characteristic function. However, the spatial frequency characteristic function and the temporal frequency characteristic function may be weighted and then added.

In the above-described embodiments, when extracting the disturbing component, the power spectrum difference between a video without image degradation and a captured video is calculated. However, the disturbing component may be extracted by masking a region where the power component amount existing in the video without image degradation is equal to or larger than a threshold.

Eighth Embodiment

In the eighth embodiment, the image capturing parameter is optimized in each image capturing mode of a camera using the video evaluation methods described in the first to seventh embodiments. There is known a camera capable of setting an image capturing mode in accordance with a capture scene. An image capturing parameter is associated with each image capturing mode. When an image capturing mode is used, image capturing is performed using an associated image capturing parameter.

Suitable camera settings are known to change depending on the capture scene. Hence, it is desirable to use a different image capturing parameter in accordance with the image capturing mode. An example of using a different image capturing parameter in accordance with the capture scene will be described by exemplifying NR (Noise Reduction) in the temporal direction.

When capturing a scene of, for example, a sport with a vigorous motion, motion blurs can be suppressed by making the NR effect in the temporal direction smaller. On the other hand, when capturing a scene of, for example, a landscape with a smaller motion, motion blurs are hardly caused by NR in the temporal direction because of the small motion. For this reason, when capturing a scene with a small motion, NR in the temporal direction can be strengthened. Such an image capturing parameter suitable for each image capturing mode is stored in the camera. Selecting an image capturing mode enables to perform image capturing using a suitable image capturing parameter.

However, large labor is needed to manually set the image capturing parameter suitable for each image capturing mode. To solve this problem, automatic parameter tuning methods have conventionally been proposed. Japanese Patent Laid-Open No. 2008-72665 discloses a method of determining an optimum frame rate by evaluating the smoothness of a motion upon displaying a video at various frame rates. However, this method cannot solve the problem that the optimum image capturing parameter may change depending on the capture scene.

In the eighth embodiment, the image capturing parameter is optimized for each image capturing mode based on an evaluation value representing the smoothness of the motion of a moving image using an object corresponding to the image capturing mode. More specifically, each capture scene is expressed using an object moving speed and an object frequency characteristic.

More specifically, an object moving speed and frequency characteristic that expresses a capture scene well are set for each image capturing mode. An evaluation target video is created based on the object moving speed and the frequency characteristic. The created evaluation target video is displayed on a display 102. A camera 103 captures the displayed video using a set image capturing parameter and thereafter an evaluation value for the captured video is calculated. Evaluation value calculation is repeated while changing the image capturing parameter of the camera 103, thereby obtaining an image capturing parameter capable of obtaining a higher evaluation value. The image capturing parameter can thus be optimized for each capture scene (image capturing mode).

Figure 32:
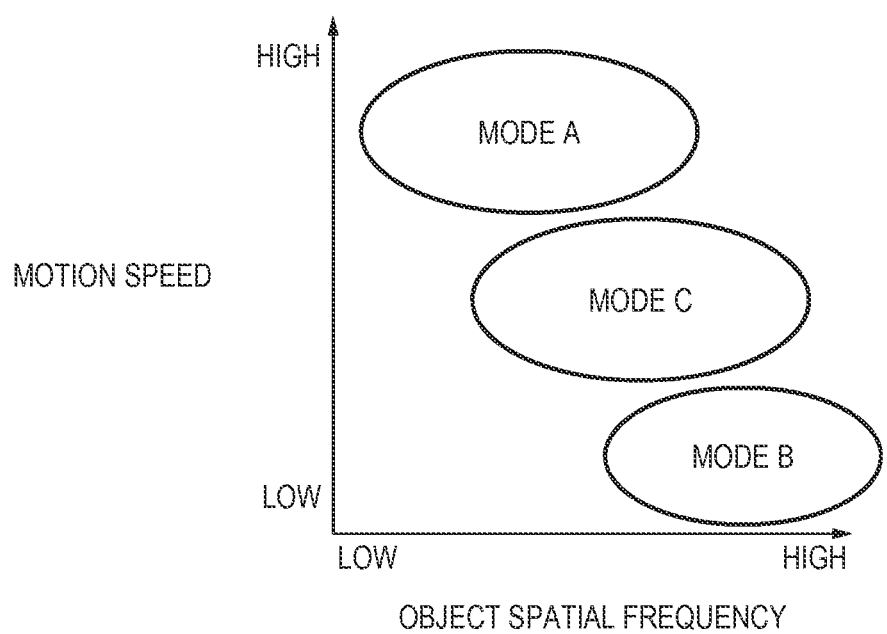
FIG. 32 is a view for explaining image capturing modes according to the eighth embodiment.

This embodiment will be described below in detail using an example in which three image capturing modes A, B, and C are prepared. The image capturing mode A is an image capturing mode for capturing a scene including an object that moves fast. The image capturing mode A is used to capture, for example, a sport. The image capturing mode B is an image capturing mode for capturing a video having a high resolution and including an object that moves slowly. The image capturing mode B is used to capture, for example, a landscape. The image capturing mode C is an intermediate mode between the image capturing mode A and the image capturing mode B and is used to capture, for example, a portrait. FIG. 32 shows the relationship of the modes A, B, and C by plotting the object frequency component along the abscissa and the object motion speed along the ordinate.

Figure 33:
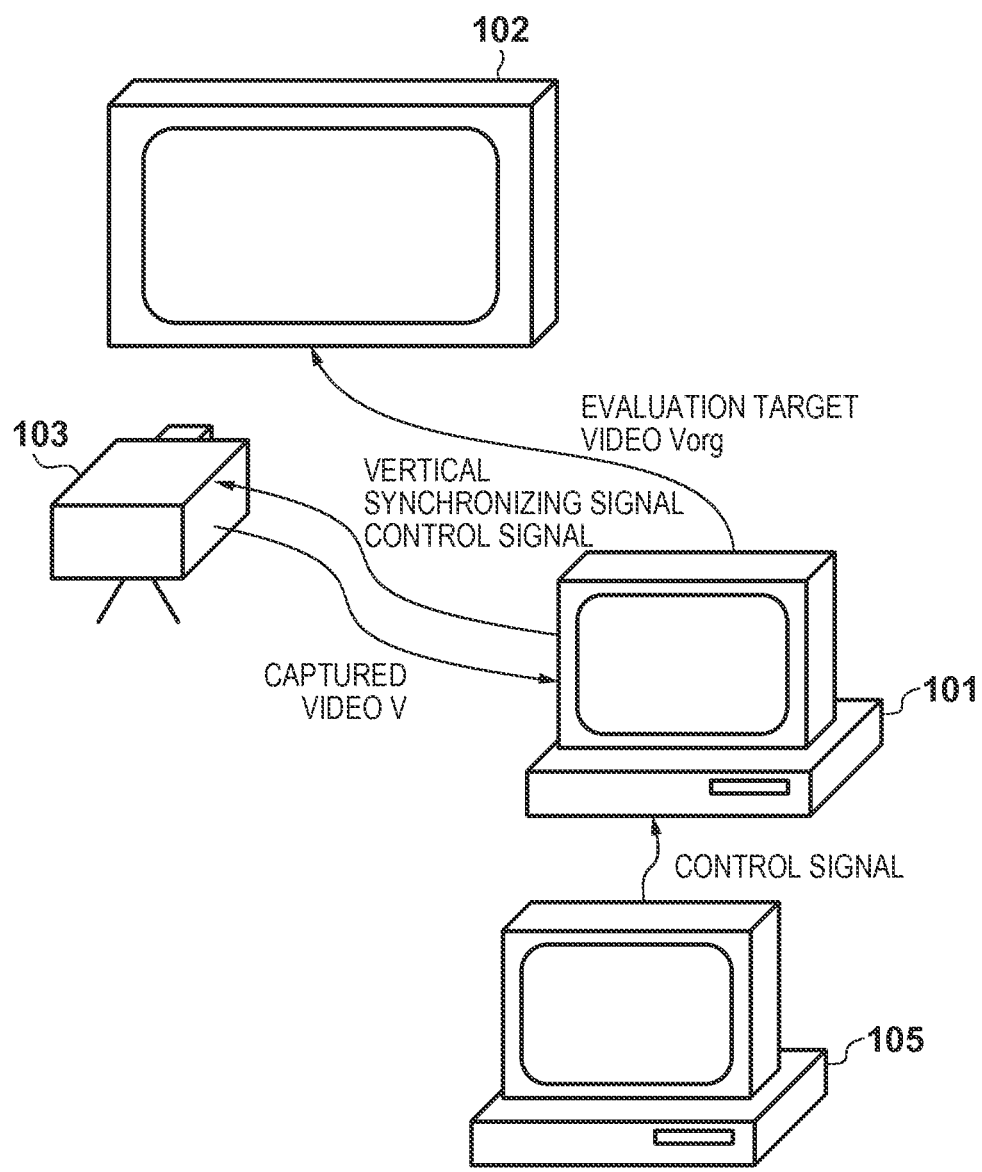
FIG. 33 is a schematic view showing an example of an image capturing parameter optimization system according to the eighth embodiment.

Processing according to this embodiment will be described with reference to FIG. 33. A parameter optimization apparatus 105 controls a video evaluation apparatus 101 and the image capturing apparatus 103, thereby optimizing the image capturing parameter of the image capturing apparatus 103. More specifically, the parameter optimization apparatus 105 acquires the designation of an appropriate chart moving speed and chart frequency for each image capturing mode. The parameter optimization apparatus 105 controls the video evaluation apparatus 101 to display a chart video including a chart image having the designated moving speed and frequency on the display 102. A test moving image for parameter optimization including the chart image in each frame image is thus displayed on the display 102. The test moving image changes between the image capturing modes. More specifically, a first test moving image for the image capturing mode A, a second test moving image for the image capturing mode B, and a third test moving image for the image capturing mode C are displayed. At least one of the moving speed of the chart image and the frequency characteristic of the chart image changes between the test moving images.

The parameter optimization apparatus 105 also controls the image capturing apparatus 103 to set the image capturing parameter. More specifically, the parameter optimization apparatus 105 sequentially sets a plurality of parameters in the image capturing apparatus 103. The video evaluation apparatus 101 calculates an evaluation value for the video displayed on the display 102 and captured by the image capturing apparatus 103 after image capturing parameter setting. The parameter optimization apparatus 105 repeatedly sets the parameter and acquires the evaluation value so as to optimize the image capturing parameter of the image capturing apparatus 103 for each image capturing mode such that the best evaluation value can be obtained for the video captured by the image capturing apparatus 103. That is, out of the plurality of parameters set in the image capturing apparatus 103, an image capturing parameter capable of obtaining a higher evaluation value is selected as the image capturing parameter of the image capturing apparatus 103 for each image capturing mode. The image capturing parameters (first image capturing parameter, second image capturing parameter, and third image capturing parameter) for the image capturing modes A to C are determined in accordance with evaluation values obtained using the first to third test moving images.

<Arrangement of Parameter Optimization Apparatus 105>

Figure 34:
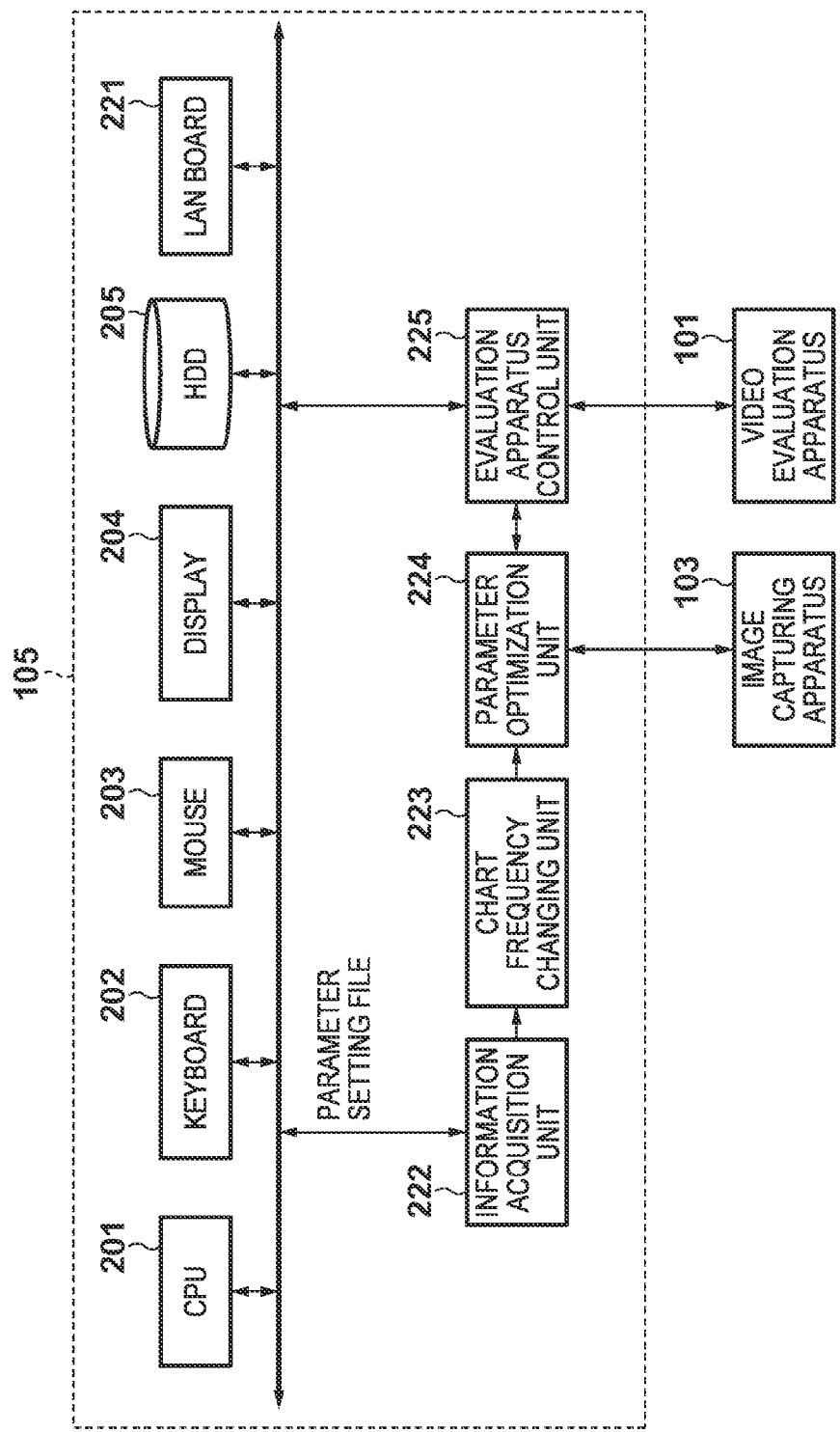
FIG. 34 is a block diagram showing an example of the arrangement of a parameter optimization apparatus according to the eighth embodiment.

The arrangement of the parameter optimization apparatus 105 will be described with reference to FIG. 34. A CPU 201 controls the operation of the entire parameter optimization apparatus 105. More specifically, the CPU 201 can acquire a user instruction via an input device such as a keyboard 202 or a mouse 203. The CPU 201 can also control the display 102, the image capturing apparatus 103, and the video evaluation apparatus 101. The CPU 201 implements the operations of an information acquisition unit 222, a chart frequency changing unit 223, a parameter optimization unit 224, and an evaluation apparatus control unit 225 to be described later. The operation of the CPU 201 can be implemented by reading out a computer program recorded in a storage medium such as an HDD 205 to a memory such as a RAM 230 and causing the CPU 201 to operate in accordance with the program.

The information acquisition unit 222 obtains information such as a chart moving speed, a chart image, a chart standard frequency, and a parameter optimization range. The information acquisition unit 222 can acquire these pieces of information via the keyboard 202 or the mouse 203 or from a storage medium such as the HDD 205. The chart frequency changing unit 223 creates a chart image having a predetermined frequency characteristic based on the information acquired by the information acquisition unit 222. The parameter optimization unit 224 sets an image capturing parameter by controlling the image capturing apparatus 103. The parameter optimization unit 224 also updates the image capturing parameter set in the image capturing apparatus 103 based on an evaluation value acquired by the evaluation apparatus control unit 225. The evaluation apparatus control unit 225 controls the video evaluation apparatus 101 based on the information acquired by the information acquisition unit 222 to perform video display on the display 102, image capturing by the image capturing apparatus 103, and image quality evaluation. The evaluation apparatus control unit 225 acquires the video evaluation value from the video evaluation apparatus 101.

<Arrangement of Video Evaluation Apparatus 101>

Figure 35:
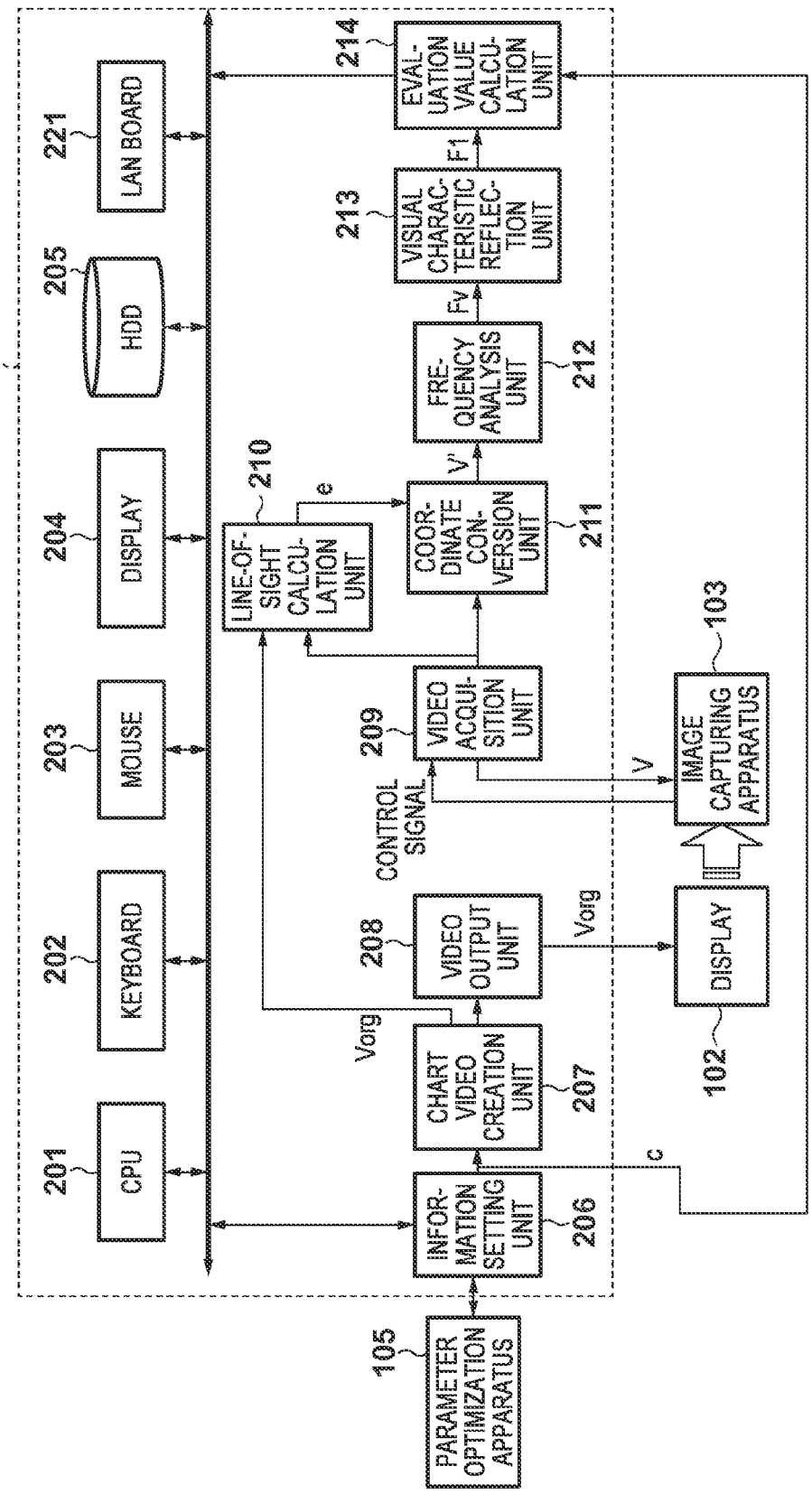
FIG. 35 is a block diagram showing an example of the arrangement of a video evaluation apparatus according to the eighth embodiment.

The arrangement of the video evaluation apparatus 101 can be the same as those described in the first to seventh embodiments. FIG. 35 illustrates an example of the arrangement of the video evaluation apparatus 101 according to this embodiment. The video evaluation apparatus 101 is connected to the parameter optimization apparatus 105 via a LAN board 221 so as to be controllable by the parameter optimization apparatus 105. An information setting unit 206 of the video evaluation apparatus 101 receives a chart image c and information about the chart moving speed from the parameter optimization apparatus 105. The video evaluation apparatus 101 creates a chart video Vorg in which the chart image c moves at the designated chart moving speed and displays it on the display 102, as in the first embodiment. The image capturing apparatus 103 captures the chart video Vorg displayed on the display 102 and records it as a captured video V. An evaluation value calculation unit 214 calculates an evaluation value using F1 calculated by a visual characteristic reflection unit 213 and a captured chart image c'. The calculated evaluation value is output to the parameter optimization apparatus 105 via the LAN board 221.

<Operations of Parameter Optimization Apparatus 105 and Video Evaluation Apparatus 101>

Figure 36:
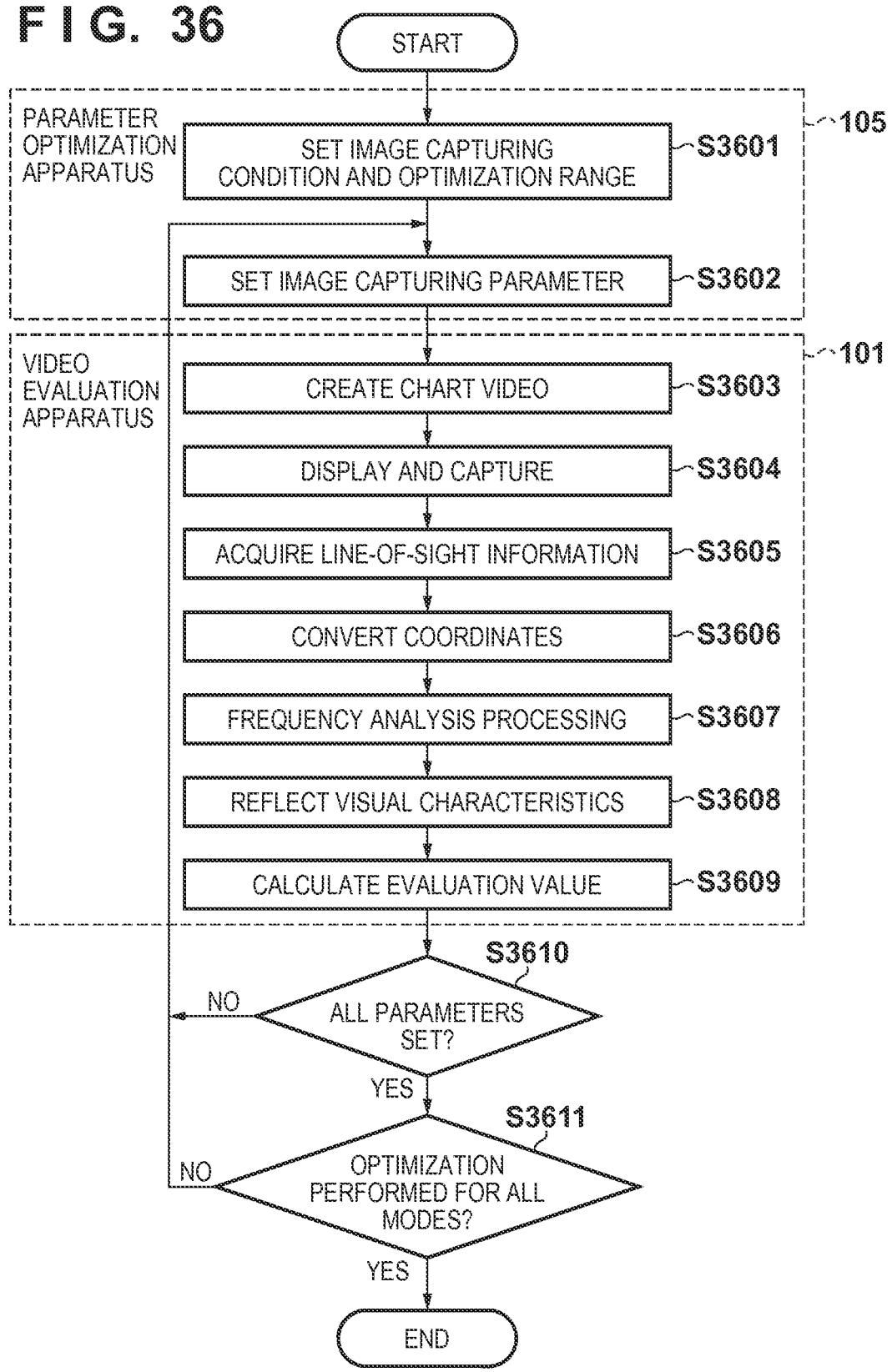
FIG. 36 is a flowchart of processing according to the eighth embodiment.

The outline of the operations to be performed by the parameter optimization apparatus 105 and the video evaluation apparatus 101 will be described next with reference to the flowchart of FIG. 36.

In step S3601, the information setting unit 206 acquires a chart moving speed and a chart frequency. The information setting unit 206 also acquires the file paths of a chart image file and an image capturing parameter optimization range file. In this embodiment, these pieces of information are set for each image capturing mode. At this time, the chart image, the chart moving speed, and the chart frequency are set so as to most properly express the image capturing environment in each image capturing mode. The image capturing parameter optimization range file describes the combinations of all parameters set in this embodiment. Details of the information setting unit 206 will be described later.

In steps S3602 to S3610, evaluation value calculation is performed using the chart image based on the information set in step S3601 and image capturing parameters described in the image capturing parameter optimization range file. This processing is performed for one image capturing mode selected from the plurality of image capturing modes.

In step S3602, the parameter optimization unit 224 sets the image capturing parameter of the image capturing apparatus 103. More specifically, the parameter optimization unit 224 loads the image capturing parameter optimization range file from the HDD 205. As described above, the file path of the image capturing parameter optimization range file is acquired by the information setting unit 206. Next, the parameter optimization unit 224 sets, in the image capturing apparatus 103, the image capturing parameter described in the image capturing parameter optimization range file next to the image capturing parameter set in the image capturing apparatus 103. Detailed processing of the parameter optimization unit 224 will be described later.

Processing from step S3603 to step S3609 is executed by the video evaluation apparatus 101 controlled by the evaluation apparatus control unit 225. In step S3603, a chart video creation unit 207 creates the chart video Vorg including the chart image c, which is to be displayed on the display 102. The chart image c and the chart moving speed are acquired from the evaluation apparatus control unit 225 via the LAN board 221. As described above, the chart image c and the chart moving speed are set in step S3601.

In processing from step S3604 to step S3609, the evaluation video Vorg obtained in step S3603 is captured by the image capturing apparatus 103, and an evaluation value representing the smoothness of the motion of the moving image is calculated. These processes are the same as the processes of steps S3130 to S3180 in the first embodiment, and a description thereof will be omitted here.

In step S3610, the parameter optimization unit 224 determines whether parameter optimization processing is completed. When the processing from step S3602 to step S3609 is performed using all parameters described in the image capturing parameter optimization range file, the parameter optimization unit 224 selects a parameter with which the highest evaluation value is obtained. The selected parameter is used as the optimum parameter for the selected image capturing mode. The process then advances to step S3611. If a parameter that has not been used yet remains, the process returns to step S3602.

In step S3611, the parameter optimization unit 224 determines whether parameter optimization is completed for all image capturing modes. If the parameter optimization is completed for all image capturing modes, the processing of FIG. 36 ends. If the parameter optimization is not completed for all image capturing modes, the process returns to step S3602 to select an unselected image capturing mode and perform parameter optimization for the selected image capturing mode.

<Information Acquisition Unit 222>

Processing of the information acquisition unit 222 will be described below in detail. The information acquisition unit 222 acquires information necessary for processing of the succeeding stage, such as the moving speed and frequency of the chart image and the file paths of the chart image file and the parameter optimization range file. An example of a method of causing the information acquisition unit 222 to acquire these pieces of information will be described below. However, the acquisition method is not limited to this.

Figure 37:
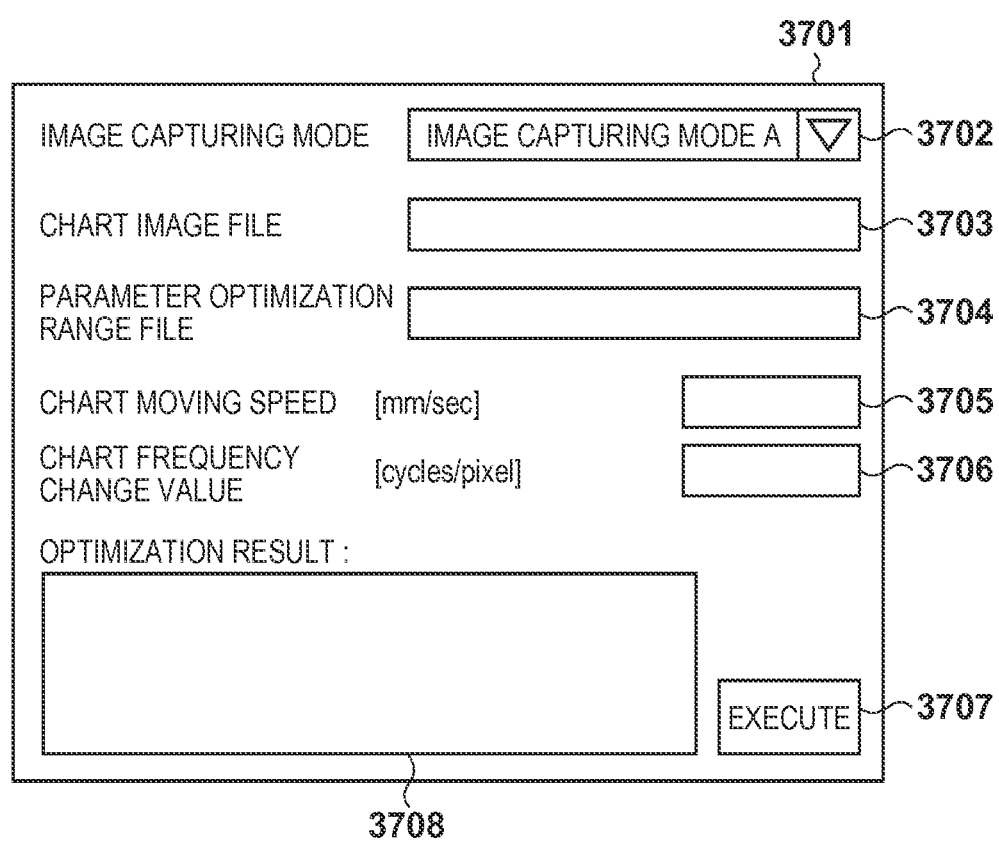
FIG. 37 is a view showing a GUI to be used to acquire a user input according to the eighth embodiment.

FIG. 37 shows an example of a GUI to be used by the information acquisition unit 222 to acquire a user input. The information acquisition unit 222 displays an application window 3701 on a display 204. The user selects, by using a pull-down menu 3702, an image capturing mode to set information. The user repeats the following operation for each of the image capturing modes (in this embodiment, three image capturing modes A, B, and C).

Figure 38C:
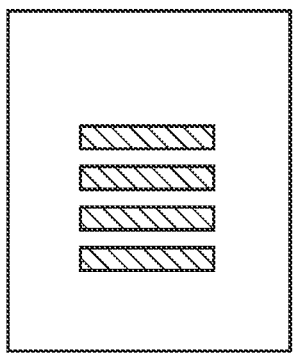
FIGS. 38A, 38B, and 38C are views showing examples of a chart image used in the eighth embodiment.

Next, the user inputs the file path of the chart image file stored in the HDD 205 to a form 3703. The information acquisition unit 222 acquires the chart image file including a chart image corg from the HDD 205 in accordance with the file path input to the form 3703. The chart image corg has a specific frequency, and an example is shown in FIG. 38A. The chart image corg is used by the chart frequency changing unit 223 to create the chart image c.

Similarly, the user inputs the file path of the parameter optimization range file stored in the HDD 205 to a form 3704. The parameter optimization range file is used by the parameter optimization unit 224 to set the image capturing parameter of the image capturing apparatus 103. In addition, the user inputs a chart moving speed to a form 3705 (chart moving speed designation unit). The value input to the form 3705 is used by the chart video creation unit 207 to create a chart video. The user also inputs a chart standard frequency to a form 3706 (frequency characteristic designation unit). The chart frequency changing unit 223 changes the frequency of the chart image corg based on the value input to the form 3706.

When the user clicks the mouse 203 on a button 3707 after inputting the above-described pieces of information for each image capturing mode, image capturing and evaluation value calculation processing start. A parameter combination that minimizes the evaluation value is displayed in a form 3708 for each image capturing mode.

<Chart Frequency Changing Unit 223>

The chart frequency changing unit 223 creates the chart image c having a value s designated in the form 3706 as a frequency. More specifically, the chart frequency changing unit 223 creates the chart image c by changing the frequency of the chart image corg. In this embodiment, the chart frequency changing unit 223 generates the chart image c by enlarging or reducing the chart image corg. However, the present invention is not limited to this.

A method of obtaining the chart image c by changing the frequency of the chart image corg will be described below. Letting p be the standard frequency of the chart image corg(x, y), coordinates (x', y') of the chart image c are represented by $$\begin{pmatrix} x' \\ y' \end{pmatrix} = \begin{pmatrix} p/s & 0 \\ 0 & p/s \end{pmatrix} \begin{pmatrix} x \\ y \end{pmatrix}$$

The standard frequency p of the chart image corg may be externally given. For example, the standard frequency p may be input by the user. The standard frequency p may be recorded in, for example, the header portion of the chart image corg. Alternatively, the standard frequency p may be calculated by analyzing the chart image corg. For example, the chart image corg may be Fourier-transformed, and a frequency having the maximum power out of the AC components may be used as p.

Figure 38B:
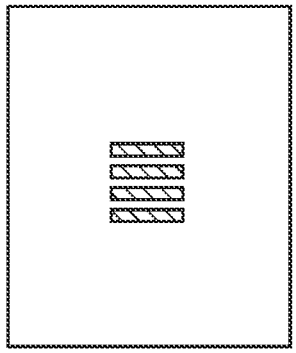
Figure 38A:
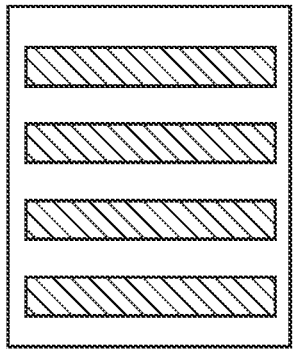

FIG. 38B shows the chart image c obtained using the image shown in FIG. 38A as the chart image corg when p/s is 2. Similarly, FIG. 38C shows the chart image c obtained using the image shown in FIG. 38A as the chart image corg when p/s is ½.

In this embodiment, the chart image c has a frequency in the x direction. However, the chart image c may have a frequency in the y direction or frequencies in both the x and y directions. In this embodiment, the chart image c is a rectangular image. However, it may be an arbitrary natural image.

For example, a suitable image may be selected as the chart image c in accordance with the image capturing mode.

<Parameter Optimization Unit 224>

The parameter optimization unit 224 sets the image capturing parameter of the image capturing apparatus 103. The parameter optimization unit 224 loads the parameter optimization range file stored in the HDD 205 in accordance with the file path of the parameter optimization range file acquired by the information acquisition unit 222. FIG. 39 shows an example of the parameter optimization range file. However, the parameter optimization range file is not limited to this.

Each line of the parameter optimization range file describes a set of image capturing parameter values designated in one image capturing. That is, the number of lines of the parameter optimization range file matches the number of times of image capturing and evaluation to be used to perform parameter optimization.

Referring to FIG. 39, FR represents the image capturing frame rate [fps]; ss, the shutter speed [1/sec]; NR_prm1 and NR_prm2, parameters to be used for noise reduction processing; and Sharp_prm1, a parameter to be used for sharpness processing. The described parameters are not limited to those. Other parameters may be described, or a smaller number of parameters may be described.

In this embodiment, an evaluation value is calculated using a combination of parameters described in the parameter optimization range file in advance. A parameter combination that gives the best evaluation value is determined as the optimum parameter. However, the parameter optimization method using the evaluation value of the smoothness of a motion is not limited to this. For example, instead of defining the parameter range in advance, the parameter may be updated sequentially. Optimization may end when the evaluation value has converged.

Ninth Embodiment

Figure 40:
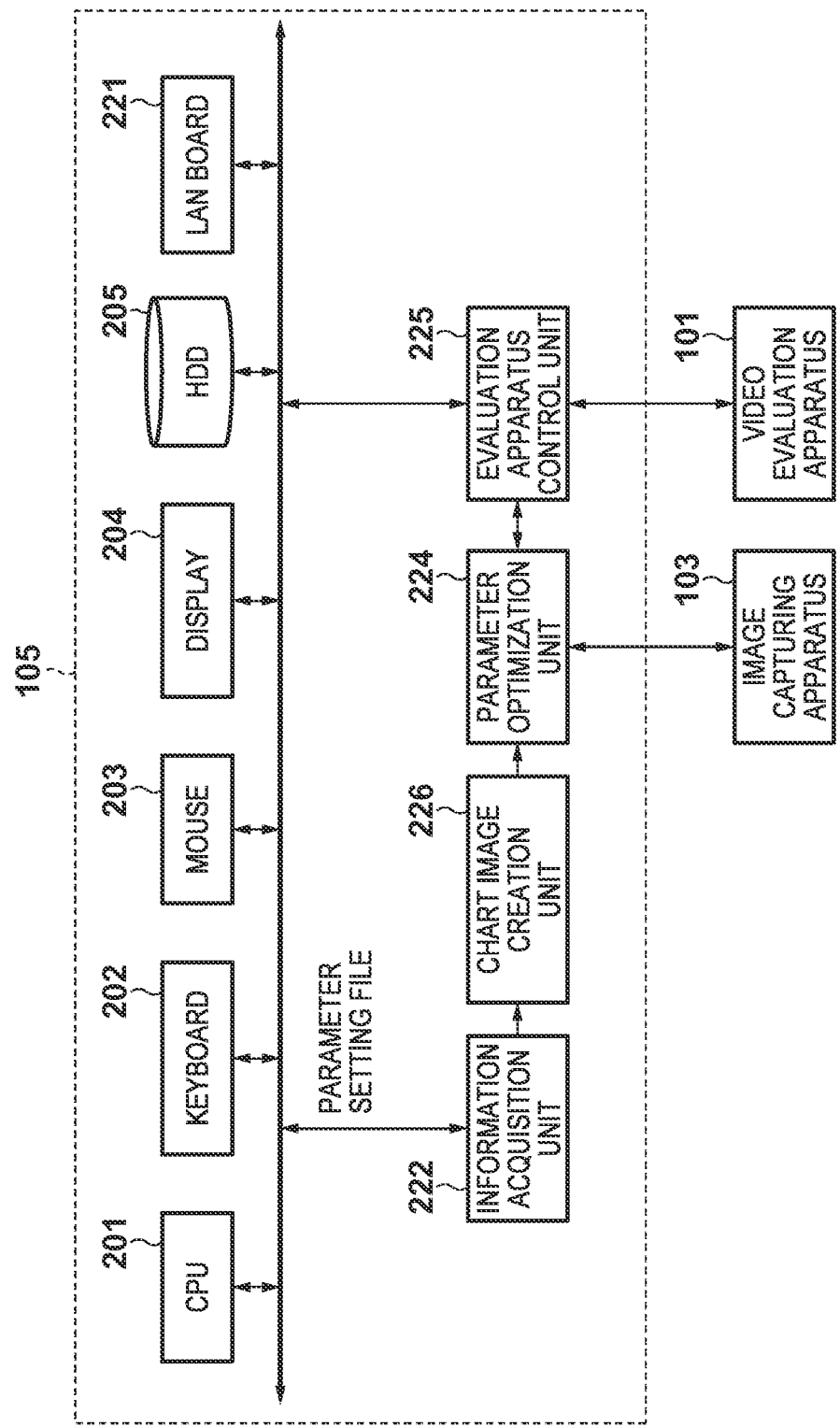
FIG. 40 is a block diagram showing an example of the arrangement of a parameter optimization apparatus according to the ninth embodiment.

In the eighth embodiment, the chart image corg is designated and enlarged or reduced to create the chart image c. However, the present invention is not limited to this method. In the ninth embodiment, the user inputs a chart frequency characteristic, and a parameter optimization apparatus 105 creates a chart image c based on the input frequency characteristic. FIG. 40 shows the arrangement of the parameter optimization apparatus 105 according to the ninth embodiment. Only the difference from the eighth embodiment will be described below.

<Information Acquisition Unit 222>

An information acquisition unit 222 acquires information necessary for processing of the succeeding stage, such as a chart image moving speed, a chart image frequency, and the file path of a parameter optimization range file. An example of a method of causing the information acquisition unit 222 to acquire these pieces of information will be described below. However, the acquisition method is not limited to this.

Figure 41:
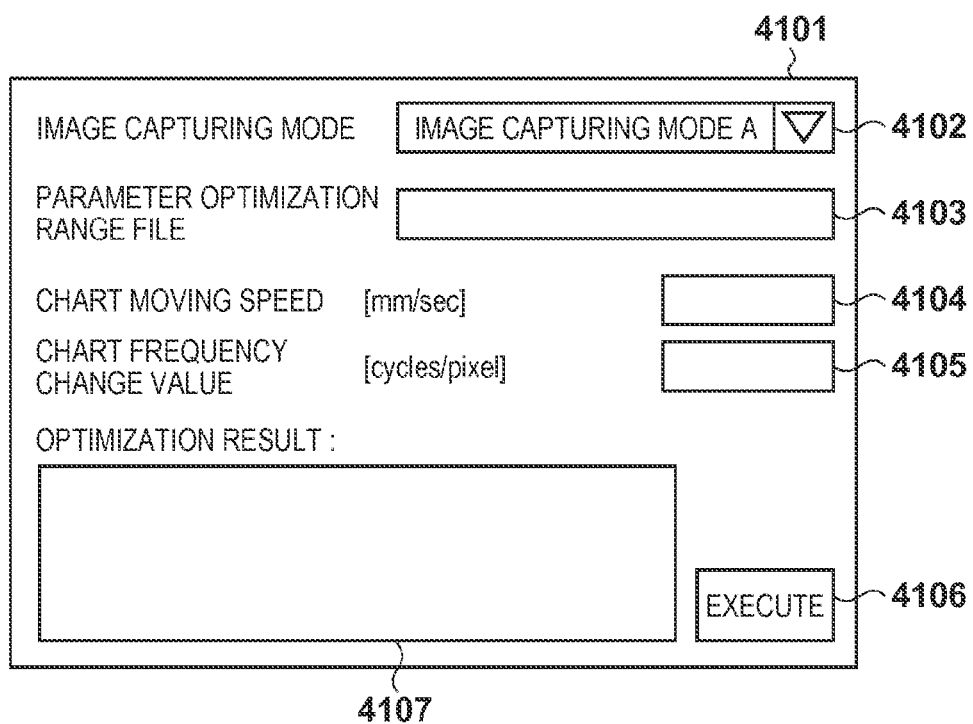
FIG. 41 is a view showing a GUI to be used to acquire a user input according to the ninth embodiment.

FIG. 41 shows an example of a GUI to be used by the information acquisition unit 222 to acquire a user input. The information acquisition unit 222 displays an application window 4101 on a display 204. The application window 4101 has a form 4103 to input the file path of the parameter optimization range file, a form 4104 to input the chart moving speed, and a form 4105 to input the chart frequency. They are the same as those provided in the application window 3701. However, the application window 4101 has no form to input the file path of a chart image file. In the ninth embodiment, a chart image creation unit 226 creates the chart image c based on the value input to the form 4105.

When the user clicks a mouse 203 on a button 4106 after inputting the above-described pieces of information for each image capturing mode, image capturing and evaluation value calculation processing start. A parameter combination that minimizes the evaluation value is displayed in a form 4107 for each image capturing mode.

<Chart Image Creation Unit 226>

The chart image creation unit 226 creates the chart image c having a chart frequency characteristic s [cycles/pixel] acquired by the information acquisition unit 222. In this embodiment, the chart image creation unit 226 creates the chart image c(x, y) by $$c(x,y)=\text{sgn}(\sin(sx))$$

where sgn is a signum, sin is a sine function (sine wave), x is the horizontal coordinate of the image, and y is the vertical coordinate of the image. The chart image c obtained in this embodiment is a rectangular wave. However, the type of the chart image c is not limited to this, and it may be, for example, a sine wave.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-139858, filed Jun. 23, 2011, and No. 2012-094180, filed Apr. 17, 2012, which are hereby incorporated by reference herein in their entirety.

What is claimed is:

1. An information processing apparatus for calculating an evaluation value representing quality of a moving image, comprising:
  a first acquisition unit configured to acquire data of an input moving image that includes a chart image in each frame image;
  a second acquisition unit configured to acquire position information representing a position of the chart image in each frame image of the input moving image;
  a cutout unit configured to cut out, from each frame image of the input moving image, a partial image including the chart image based on the position information and generate a converted moving image having the cutout partial image as a frame image;
  a third acquisition unit configured to acquire a frequency component value obtained by frequency-converting the chart image in a spatial direction;
  a conversion unit configured to frequency-convert the converted moving image at least in a temporal direction and the spatial direction; and
  a calculation unit configured to calculate the evaluation value based on a frequency component value in the spatial direction obtained by said conversion unit, a frequency component value in the temporal direction obtained by said conversion unit, and the frequency component value obtained by said third acquisition unit.

2. The apparatus according to claim 1, wherein the input moving image is obtained by displaying, on a display apparatus, a moving image that includes the chart image in each frame image and causing an image capturing apparatus to capture the displayed moving image.

3. The apparatus according to claim 2, further comprising:
  a fourth acquisition unit configured to acquire the chart image; and
  a subtraction unit configured to subtract each pixel value of the chart image from each pixel value of each frame image of the converted moving image,
  wherein said conversion unit is further configured to frequency-convert the converted moving image after processing of said subtraction unit in the temporal direction and a spatial direction.

4. The apparatus according to claim 3, wherein said fourth acquisition unit is further configured to acquire the chart image from a still image obtained by displaying a frame image including the chart image on the display apparatus and causing the image capturing apparatus to capture the displayed frame image.

5. The apparatus according to claim 1, wherein said conversion unit is further configured to weight the frequency component value obtained by frequency conversion in accordance with visual characteristics of an observer of the moving image.

6. An information processing apparatus comprising:
  a setting unit configured to set one of a plurality of image capturing parameters sequentially in an image capturing apparatus;
  an acquisition unit configured to acquire an evaluation value, calculated by the information processing apparatus of claim 1, for an input moving image obtained by displaying, on a display apparatus, a test moving image that includes a chart image in each frame image and causing the image capturing apparatus after the setting to capture the displayed test moving image; and
  a selection unit configured to select, from the plurality of image capturing parameters, an image capturing parameter resulting in a higher evaluation value.

7. The apparatus according to claim 6, wherein the display apparatus displays a first test moving image and a second test moving image in which at least one of a moving speed of the chart image and a frequency characteristic of the chart image is different from that of the first test moving image, and
  said selection unit is further configured to select a first image capturing parameter to be used by the image capturing apparatus in accordance with the evaluation value obtained using the first test moving image and a second image capturing parameter to be used by the image capturing apparatus in accordance with the evaluation value obtained using the second test moving image.

8. An information processing method for calculating an evaluation value representing quality of a moving image, comprising:
  acquiring data of an input moving image that includes a chart image in each frame image;
  acquiring position information representing a position of the chart image in each frame image of the input moving image;

cutting out, from each frame image of the input moving image, a partial image including the chart image based on the position information and generating a converted moving image having the cutout partial image as a frame image;

acquiring a frequency component value obtained by frequency-converting the chart image in a spatial direction;

frequency-converting the converted moving image in a temporal direction and the spatial direction; and calculating the evaluation value based on a frequency component value in the spatial direction obtained in said conversion step, a frequency component value in the temporal direction obtained in said conversion step, and the frequency component value obtained in said frequency component acquiring step.

9. An information processing method comprising:

setting one of a plurality of image capturing parameters sequentially in an image capturing apparatus;

acquiring an evaluation value calculated by an information processing method of claim 8 for an input moving image obtained by displaying, on a display apparatus, a test moving image that includes a chart image in each frame image and causing the image capturing apparatus after the setting to capture the displayed test moving image; and selecting, from the plurality of image capturing parameters, an image capturing parameter resulting in a higher evaluation value.

10. A non-transitory storage medium storing a program for controlling a computer to function as each unit of the information processing apparatus of claim 1 when the program is executed by the computer.

11. A non-transitory storage medium storing a program for controlling a computer to function as each unit of the information processing apparatus of claim 6 when the program is executed by the computer.

\* \* \* \* \*